US012343996B2

(12) United States Patent
Tanase

(10) Patent No.: US 12,343,996 B2
(45) Date of Patent: Jul. 1, 2025

(54) CLEANING METHOD FOR DISCHARGING HEAD

(71) Applicant: SEIKO EPSON CORPORATION, Tokyo (JP)

(72) Inventor: Kazuyoshi Tanase, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 201 days.

(21) Appl. No.: 18/174,798

(22) Filed: Feb. 27, 2023

(65) Prior Publication Data

US 2023/0311516 A1 Oct. 5, 2023

(30) Foreign Application Priority Data

Feb. 28, 2022 (JP) ................................ 2022-029111

(51) Int. Cl.
*B41J 2/165* (2006.01)

(52) U.S. Cl.
CPC ....... *B41J 2/16508* (2013.01); *B41J 2/16511* (2013.01); *B41J 2/16535* (2013.01); *B41J 2/16538* (2013.01); *B41J 2/16502* (2024.05)

(58) Field of Classification Search
CPC ............... B41J 2/16508; B41J 2/16511; B41J 2/16535; B41J 2/16538; B41J 2/16502
See application file for complete search history.

(56) References Cited

U.S. PATENT DOCUMENTS

2021/0031530 A1* 2/2021 Shimada .................... B41J 2/14

FOREIGN PATENT DOCUMENTS

JP 2020-192728 A 12/2020

* cited by examiner

*Primary Examiner* — Geoffrey S Mruk
(74) *Attorney, Agent, or Firm* — WORKMAN NYDEGGER

(57) ABSTRACT

A cleaning method for a discharging head includes a nozzle surface wiping step for wiping a first cover member, a nozzle surface, and a second cover member by a first wiping member, with the discharging head and a first cleaning part moving relative to each other, and a second cover member cleaning step for cleaning the second cover member by a second wiping member, with the discharging head and a second cleaning part reciprocating relative to each other along the first direction. The second cover member cleaning step includes a second boundary cleaning step for cleaning a region including the second boundary by the second wiping member.

15 Claims, 21 Drawing Sheets

CLEANING METHOD FOR DISCHARGING HEAD

The present application is based on, and claims priority from JP Application Serial Number 2022-029111, filed Feb. 28, 2022, the disclosure of which is hereby incorporated by reference herein in its entirety.

BACKGROUND

1. Technical Field

The present disclosure relates to a cleaning method for a discharging head.

2. Related Art

An inkjet printer, which is an example of a printing apparatus, includes a discharging head for discharging ink. Through repeated printing, the discharging head is contaminated by ink mist adhered thereto. When the discharging head is contaminated, discharge failure may occur with droplets failing to be discharged in proper directions. JP-A-2020-192728 discloses an inkjet printer configured to clean the discharging head by pressing a roll-shaped cleaning sheet against the discharging head.

The contaminant adhered to the discharging head may not be removable by the cleaning sheet simply pressed thereagainst. There is a problem in that the contaminant adhered to a non-planar portion of the discharging head is particularly difficult to remove.

SUMMARY

In a cleaning method for a discharging head of a printing apparatus according to an aspect of the present disclosure, the printing apparatus including the discharging head configured to discharge liquid onto a medium moving relative to the discharging head, a first cleaning part configured to clean the discharging head, and a second cleaning part configured to clean the discharging head, the discharging head including a head body including a nozzle surface in which a plurality of nozzles configured to discharge the liquid are opened, the nozzle surface including a first end edge and a second end edge and the plurality of nozzles being positioned between the first end edge and the second end edge, a first cover member attached to the head body and covering the first end edge, and a second cover member attached to the head body and covering the second end edge, the nozzle surface including a first boundary being a boundary with the first cover member and a second boundary being a boundary with the second cover member, the first boundary and the second boundary extending in a first direction, the second cleaning part including a second wiping member configured to absorb the liquid and a second holding unit configured to hold the second wiping member, the first cleaning part including a first wiping member made of a material with lower absorbability for the liquid than that of the second wiping member and a first holding unit configured to hold the first wiping member, the cleaning method includes: a nozzle surface wiping step for wiping the first cover member, the nozzle surface, and the second cover member by the first wiping member, with the discharging head and the first cleaning part moving relative to each other, and a second cover member cleaning step for cleaning the second cover member by the second wiping member, with the discharging head and the second cleaning part reciprocating relative to each other along the first direction, wherein the second cover member cleaning step includes a second boundary cleaning step for cleaning a region including the second boundary by the second wiping member.

DESCRIPTION OF EXEMPLARY EMBODIMENTS

A cleaning method for a discharging head 23 according to an embodiment will be described with reference to FIG. 1 to FIG. 21. The discharging head 23 is installed in, for example, an inkjet printer, which is an example of a printing apparatus 11. The printer performs printing by discharging ink, which is an example of liquid, onto a medium 10.

Overall Configuration of Printing Apparatus

Figure 1:
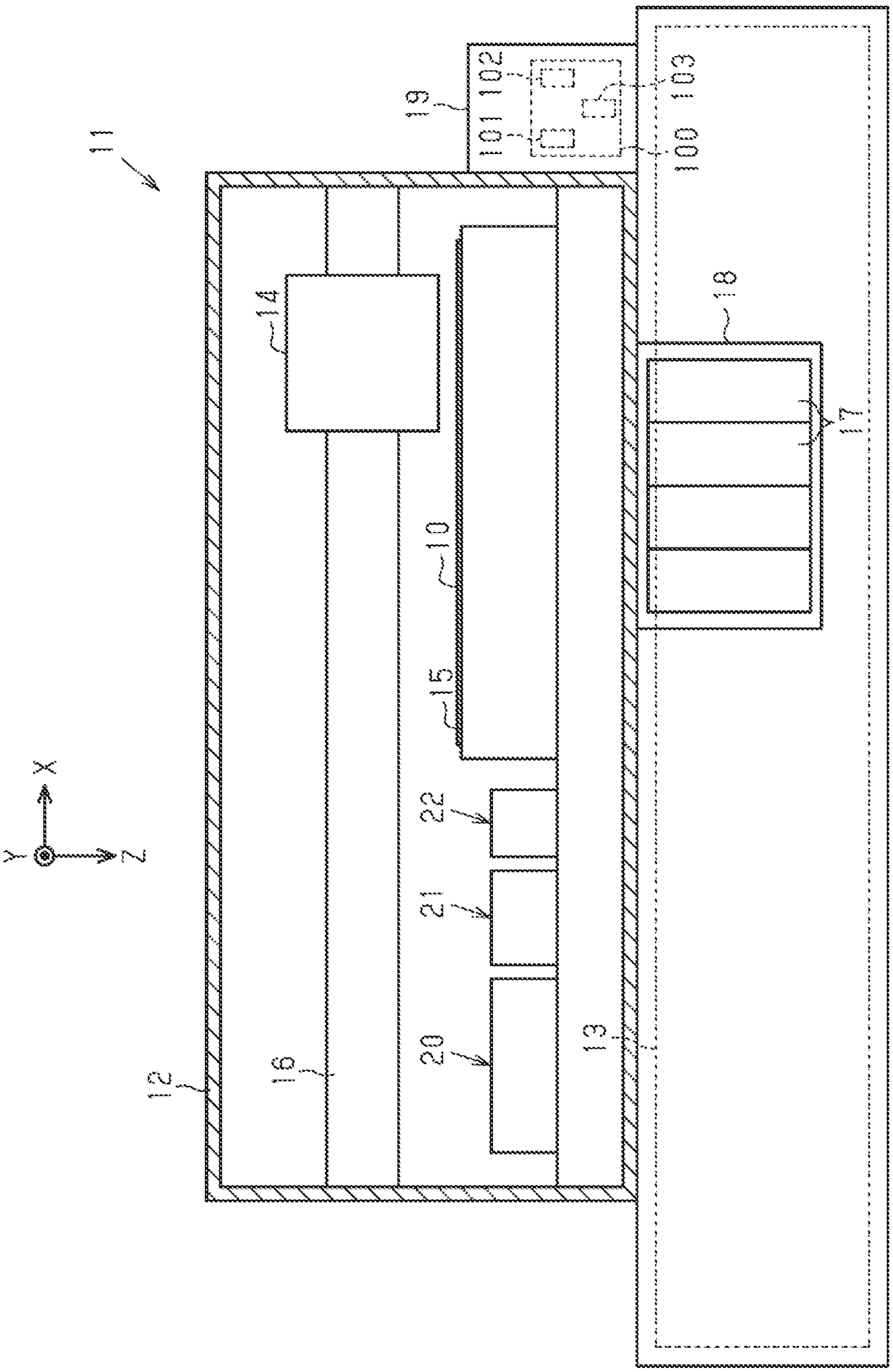
FIG. 1 is a schematic view of a printing apparatus according to an embodiment.

As illustrated in FIG. 1, the printing apparatus 11 includes an exterior case 12, a conveyance device 13, and a discharging mechanism 14. The printing apparatus 11 may include a support base 15 that supports the medium 10 in the exterior case 12. The medium 10 is, for example, roll paper or paper cut to a specified size. The conveyance device 13 conveys the medium 10 onto the support base 15.

The printing apparatus 11 may include a movement mechanism 16 that reciprocates the discharging mechanism 14 along the printing direction. The discharging mechanism 14 is configured to discharge the liquid in a discharging direction toward the medium 10. When the liquid is discharged, at least one of the discharging mechanism 14 and the medium 10 moves along a printing direction. In other words, the discharging mechanism 14 performs printing while moving relative to the medium 10 along the printing direction.

The discharging direction is a direction intersecting, that is, for example, orthogonal to the printing direction. A direction intersecting, that is, for example, orthogonal to both the printing direction and the discharging direction is referred to as a first direction Y in the present disclosure. The first direction Y is, for example, a width direction of the medium 10. In the present disclosure, the printing direction corresponds to a second direction X, and the discharging direction corresponds to a third direction Z.

The drawings illustrating the structure of the present disclosure all use the same XYZ coordinate system, although the coordinate axes may be omitted in the drawings. In these drawings, the right side corresponds to the second direction X (hereinafter, also referred to as "+X direction"), and the left side corresponds to a direction (hereinafter, also referred to as "−X direction") opposite to the second direction X. In the present disclosure, the lower side (direction toward the medium 10) corresponds to the third direction Z (hereinafter also referred to as "+Z direction"), and the upper side corresponds to a direction (hereinafter, also referred to as "−Z direction") opposite to the third direction Z. In order to clearly illustrate the main points of the present disclosure, the drawings are illustrated with exaggeration of differences in shape and size between components, omission of less relevant components, and the like.

The printing apparatus 11 may include a mounting portion 18 for mounting one or more liquid containers 17. The liquid container 17 is, for example, a tank, a cartridge, or a pack that contains liquid. The liquid container 17 may be detachably mounted to the discharging mechanism 14. A plurality of the liquid containers 17 may contain different types of liquid, for example, ink of different colors. The liquid may be supplied to the liquid container 17 from another liquid container through a supply tube not illustrated. The other liquid container may be disposed inside or outside the exterior case 12.

The printing apparatus 11 may include an operation panel 19 and a controller 100. The operation panel 19 includes, for example, a touch panel type display, a key, a button, or a switch. The controller 100 can acquire the contents of operations performed by a user through the operation panel 19. The controller 100 can display various types of information about a display of the operation panel 19.

The printing apparatus 11 includes a cleaning unit 20. The printing apparatus 11 may include an inspection mechanism 21 and a flushing box 22. The cleaning unit 20, the inspection mechanism 21, the flushing box 22, and the support base 15 may be arranged in this order along the second direction X. Inspection on discharge failure and status is performed with the discharging mechanism 14 discharging the liquid to the inspection mechanism 21. The discharging mechanism 14 performs flushing by discharging the liquid to the flushing box 22 at a predetermined timing.

Control Mechanism

As illustrated in FIG. 1, the controller 100 may include a processing circuitry 101, a storage unit 102, and a communication unit 103. The storage unit 102 includes non-volatile memory, such as, for example, RAM and ROM. The storage unit 102 stores various programs and information that is various thresholds for example, used when executing the programs. Various removable memories may be mounted to the printing apparatus 11.

The processing circuitry 101 is configured to execute software processing according to the present disclosure. The processing circuitry 101 may include a dedicated hardware circuit (such as ASIC for example) that processes at least part of the software processing. Thus, the software processing may be executed by the processing circuitry including at least one of one or a plurality of software processing circuits and one or a plurality of dedicated hardware circuits.

The communication unit 103 may include various removable memories and a communication interface circuit. The communication interface circuit is configured to communicate, using various communication protocols, with other apparatuses connected in a wired or wireless manner to the printing apparatus 11. The processing circuitry 101 can acquire a print job that is data for the printing from another apparatus (a computer of the user for example) through the communication unit 103. The processing circuitry 101 causes execution of a liquid discharging operation and various maintenance operations, based on the program stored in the storage unit 102.

The processing circuitry 101 causes the execution of the liquid discharging operation, based on an instruction input through the operation panel 19, for example. More specifically, the discharging mechanism 14 is reciprocated while discharging the liquid onto the medium 10 conveyed onto the support base 15. In this manner, printing is performed if the printing apparatus 11 is a printer. A region on the support base 15 onto which the liquid is discharged for the printing is referred to as a printing region.

The processing circuitry 101 causes, for example, execution of a series of maintenance operations including cleaning each time a period (for example, an hour) during which liquid discharging (printing operation) continues elapses. In addition, the processing circuitry 101 may cause execution of the series of maintenance operations before the liquid discharging starts or after the liquid discharging has ended.

Discharging Mechanism

Figure 2:
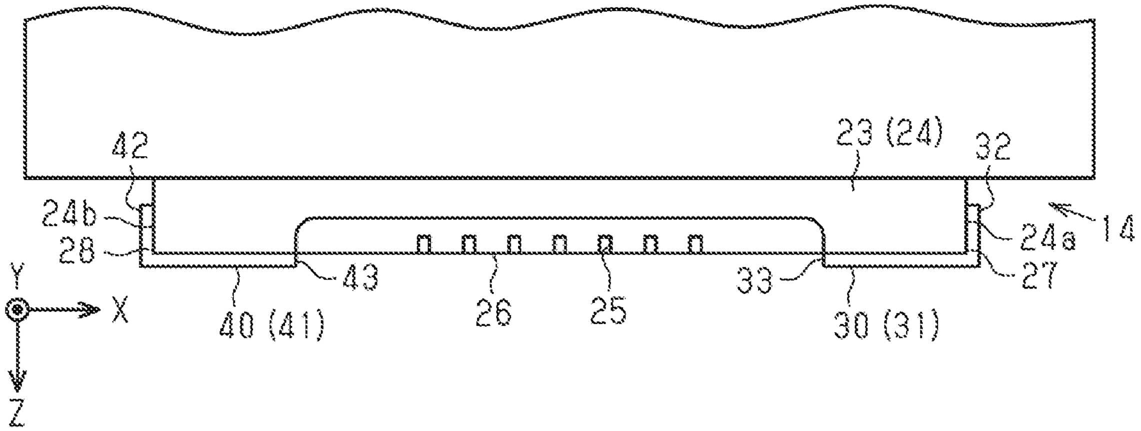
FIG. 2 is a schematic view of a discharging head of the printing apparatus illustrated in FIG. 1.
Figure 3:
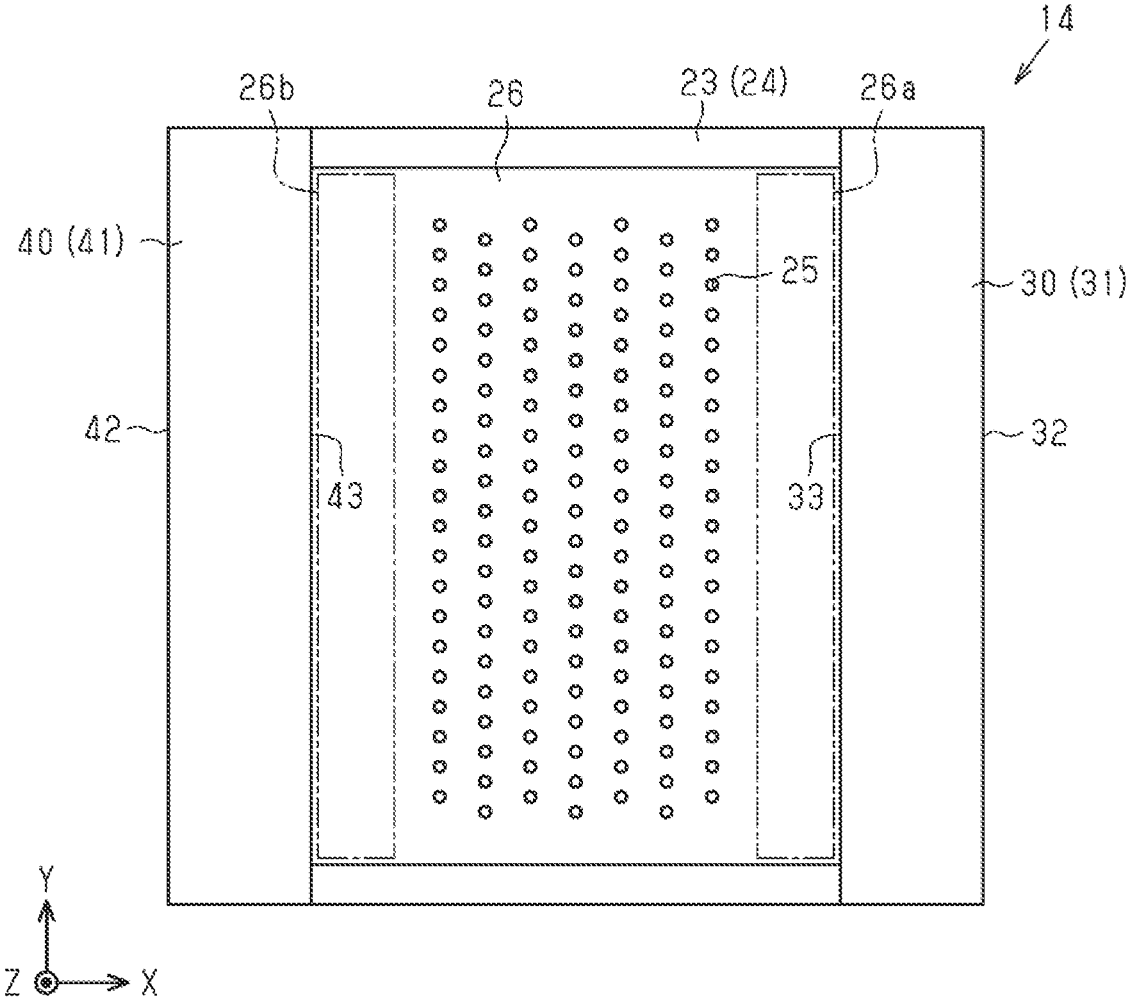
FIG. 3 is a bottom view of the discharging head illustrated in FIG. 2.

The discharging mechanism 14 includes one or more discharging heads 23 as illustrated in FIG. 2 and FIG. 3. The discharging head 23 is configured to discharge the liquid onto the medium 10 moving relative to the discharging head 23. Each of the discharging heads 23 includes a head body 24, a first cover member 30, and a second cover member 40. The head body 24 may have a generally rectangular parallelepiped outer shape. The head body 24 includes a plurality of nozzles 25 that discharge the liquid. The head body 24 includes a nozzle surface 26 where the plurality of nozzles 25 are opened.

The first direction Y and the second direction X are directions along the nozzle surface 26. The third direction Z is a direction intersecting, that is, for example, orthogonal to the nozzle surface 26. The nozzle surface 26 includes a first end edge 27 and a second end edge 28. The plurality of nozzles 25 are positioned between the first end edge 27 and the second end edge 28. The first end edge 27 and the second end edge 28 extend in the first direction Y.

The head body 24 includes side walls **24*a* and 24*b* intersecting the nozzle surface 26. The first side wall 24*a*** extends in the −Z direction from the first end edge 27. The second side wall 24*b* extends in the −Z direction from the second end edge 28.

The first cover member 30 is attached to the head body 24 to cover the first end edge 27. The second cover member 40 is attached to the head body 24 to cover the second end edge 28. The cover members 30 and 40 are, for example, provided for protecting the nozzle surface 26 from foreign matters adhered to the medium 10 (see FIG. 1) or the medium 10 bent. The cover members 30 and 40 may be disposed on the leading edge in the printing direction of the discharging head 23. In the present disclosure, since the discharging head 23 reciprocates along the second direction X, the first cover member 30 and the second cover member 40 are disposed at both ends of the nozzle surface 26 in the second direction X.

The first cover member 30 includes a first protection surface 31, an outer side surface 32, and a first boundary surface 33. The first protection surface 31 protrudes beyond the nozzle surface 26 in the third direction Z. The first protection surface 31 extends in the first direction Y and the second direction X. The first protection surface 31 may be parallel to the nozzle surface 26. The outer side surface 32 extends along the first side wall 24*a*. The first boundary surface 33 serves as a first boundary positioned between the first protection surface 31 and the nozzle surface 26. A region between the first boundary surface 33 and the nozzles 25 in the second direction X is referred to as a first boundary region 26*a* (see FIG. 3).

The second cover member 40 includes a second protection surface 41, an outer side surface 42, and a second boundary surface 43. The second protection surface 41 protrudes beyond the nozzle surface 26 in the third direction Z. The second protection surface 41 extends in the first direction Y and the second direction X. The second protection surface 41 may be parallel to the nozzle surface 26. The outer side surface 42 extends along the second side wall 24*b*. The second boundary surface 43 serves as a second boundary positioned between the second protection surface 41 and the nozzle surface 26. A region between the second protection surface 41 and the nozzles 25 in the second direction X is referred to as a second boundary region 26*b* (see FIG. 3).

The nozzle surface 26 includes the first boundary being a boundary with the first cover member 30 and the second boundary being a boundary with the second cover member 40. The first boundary and the second boundary extend in the first direction Y. The first boundary and the second boundary (second boundary surface 43) may be parallel to each other. The first boundary is substantially the first boundary surface 33, and the second boundary is substantially the second boundary surface 43.

Cleaning Unit

Figure 4:
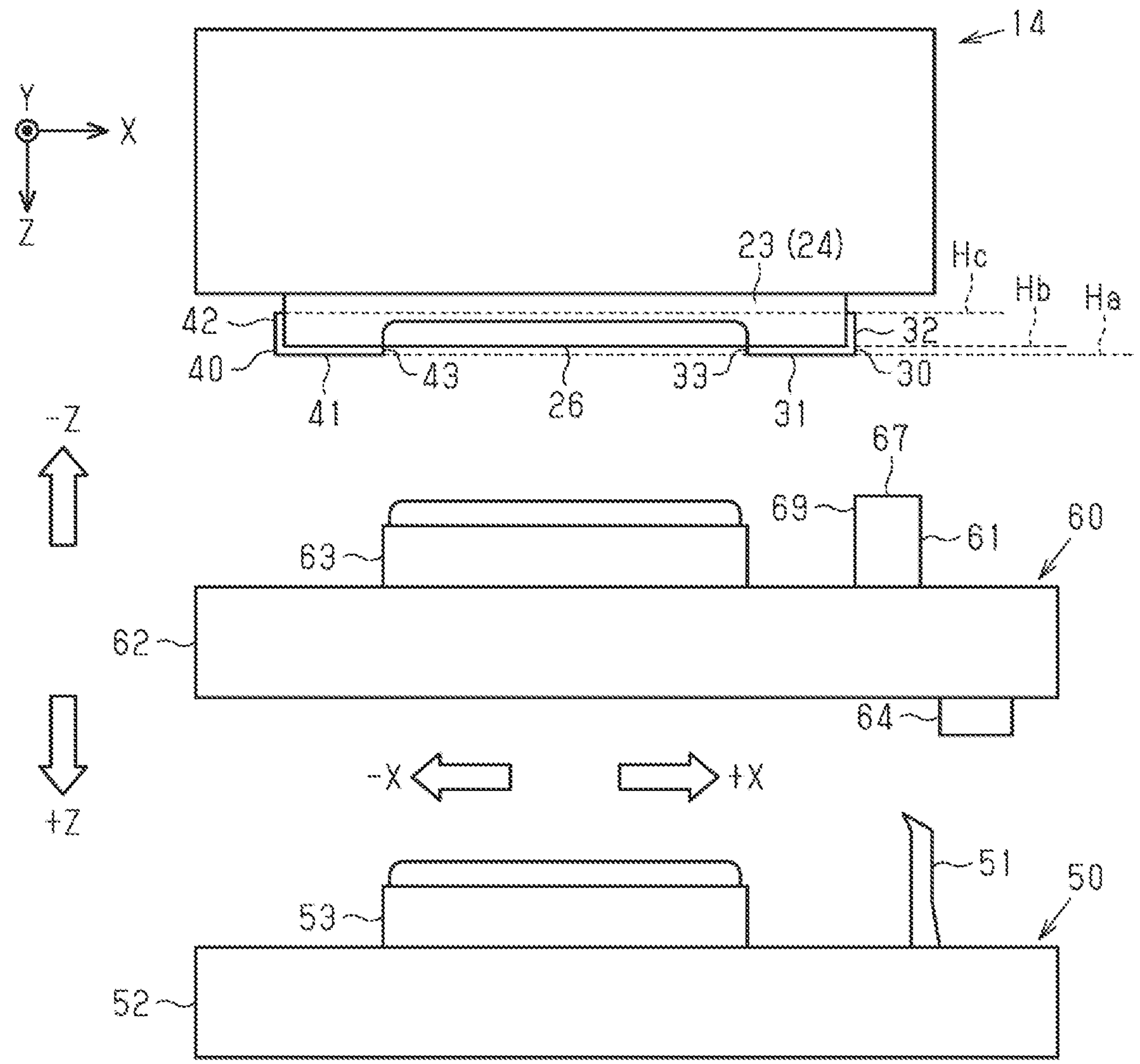
FIG. 4 is a schematic view of the discharging head, a first cleaning part, and a second cleaning part of the printing apparatus illustrated in FIG. 1.

The cleaning unit 20 (see FIG. 1) includes a first cleaning part 50 and a second cleaning part 60 as illustrated in FIG. 4. The first cleaning part 50 and the second cleaning part 60 are used to clean the one or more discharging heads 23. The first cleaning part 50 includes one or more first wiping members 51, a first holding unit 52, and one or more first caps 53. The second cleaning part 60 includes one or more second wiping members 61, a second holding unit 62, and one or more second caps 63. The second cleaning part 60 may include one or more cleaners 64. A length of the second wiping member 61 in the first direction Y is larger than a length of the cover members 30 and 40 in the first direction Y.

FIG. 4 illustrates a state where the discharging head 23 is at a home position, the first cleaning part 50 is at a first origin position, and the second cleaning part 60 is at a second origin position. The discharging head 23, the first cleaning part 50, and the second cleaning part 60 may each be individually movable in the +X direction and the −X direction from the position illustrated in FIG. 4. The discharging head 23 may further be capable of reciprocating along the first direction Y. The first cleaning part 50 and the second cleaning part 60 may each be individually movable in the +Z direction and the −Z direction from the position illustrated in FIG. 4.

In other words, each of the first cleaning part 50 and the second cleaning part 60 is capable of individually reciprocating in both of the second direction X and the third direction Z. Thus, the cleaning parts 50 and 60 and the discharging head 23 can move relative to each other in each of the first direction Y, the second direction X, and the third direction Z.

The second origin position is between the home position and the first origin position. In a state where the first cleaning part 50 is at the first origin position and the second cleaning part 60 is at the second origin position, even when one of the first cleaning part 50 and the second cleaning part 60 moves in the second direction X to pass through the other, the parts do not come into contact with each other.

The first wiping members 51 and the first caps 53 are held on a first side (upper side) by the first holding unit 52 and thus may face the discharging mechanism 14 in the third direction Z. When the discharging mechanism 14 includes a plurality of the discharging heads 23, the number of the first wiping members 51 and the first caps 53 in the first cleaning part 50 may be the same as at least the number of the discharging heads 23 or more. A length of the first wiping members 51 in the first direction Y is longer than a length of the cover members 30 and 40 in the first direction Y.

The first wiping member 51 is manufactured using a material with lower absorbability for liquid than that of the second wiping member 61. An example of such a material is elastomer. The first wiping member 51 is, for example, a plate-shaped elastic body. The first wiping member 51 is also referred to as wiper or rubber wiper. The first cap 53 is, for example, a cleaning cap that receives liquid (waste liquid) discharged from the nozzles 25 for cleaning the discharging head 23.

When the cleaning is performed, the second cleaning part 60 is retracted in the −X direction from the second origin position, to open a space for the first cleaning part 50 to move in the −Z direction from the first origin position. A position of the second cleaning part 60 after moving in the −X direction to enable the movement of the first cleaning part 50 in the −Z direction is referred to as a second retracted position. When the first cleaning part 50 moves in the −Z direction after the second cleaning part 60 has moved to the second retracted position, capping is performed with the first cap 53 coming into contact with the nozzle surface 26.

The second wiping member 61 and the second cap 63 are held on the first side (upper side) by the second holding unit 62 and thus may face the discharging mechanism 14 in the third direction Z. The cleaner 64 is held on a second side (lower side), which is opposite to the first side in the third direction Z, by the second holding unit 62. The cleaner 64 is manufactured using a liquid absorbing material. The cleaner 64 is used for cleaning the first wiping members 51.

When the cleaner 64 cleans the first wiping member 51, the first cleaning part 50 moves in the −Z direction to have a distal end of the first wiping member 51 positioned between a lower end (distal end) and an upper end (base end) of the cleaners 64 in the third direction Z. The position of the first cleaning part 50 at this timing is referred to as a cleaned position. In this state, the second cleaning part 60 moves along the second direction X, whereby the first wiping member 51 is cleaned by the cleaner 64.

When the discharging mechanism 14 includes a plurality of the discharging heads 23, the number of the second wiping members 61 and the second caps 63 in the second cleaning part 60 may be the same as at least the number of the discharging heads 23 or more. The number of the cleaners 64 of the second cleaning part 60 may be the same as the number of the discharging heads 23.

The second cap 63 is, for example, a moisturizing cap that covers the nozzle surface 26 when the liquid is not discharged to suppress drying of the nozzles 25. When the second cleaning part 60 moves in the −Z direction in the state illustrated in FIG. 4, moisturizing capping is performed. When the moisturizing capping is performed, the second cap 63 comes into contact with the nozzle surface 26 to have the distal end (lip portion) surrounding the nozzles 25, and then the second holding unit 62 moves toward the nozzle surface 26 by a predetermined distance. As a result, the lip portion of the second cap 63 elastically deforms, to be brought into close contact with the nozzle surface 26. The position of the second cleaning part 60 at this timing is referred to as a capping position.

The second wiping member 61 is manufactured using a liquid absorbing material. The second wiping member 61 is also referred to as a wiper pad. The liquid absorbing material is, for example, cloth or paper with excellent cleanability and absorbability. The cloth is a nonwoven or woven cloth, and the woven cloth may be made of polyester, nylon, or cotton, for example. The second wiping member 61 may be an elastic body.

Figure 5:
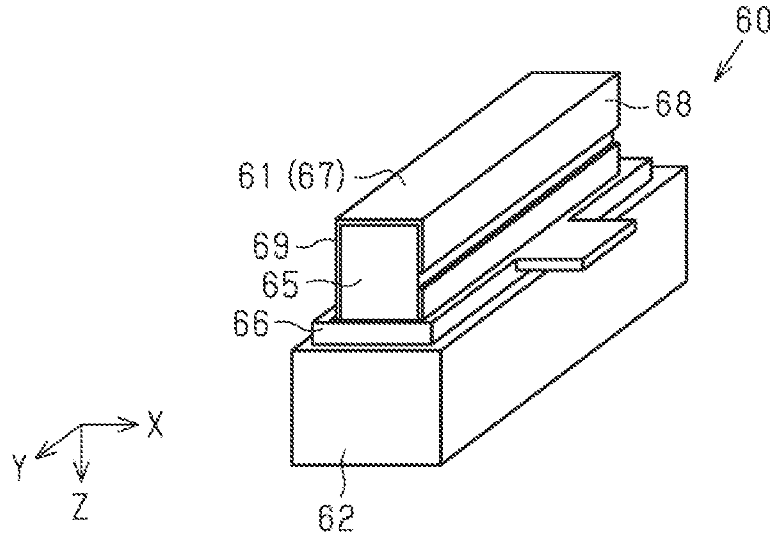
FIG. 5 is a perspective view of the second cleaning part illustrated in FIG. 4.

When the second wiping member 61 is a sheet shaped absorber, the second cleaning part 60 may include an elastic body 65 wrapped by the second wiping member 61 as illustrated in FIG. 5. The elastic body 65 may be, for example, rubber sponge formed by urethane foam or silicone rubber, and may be soft solid rubber (for example, silicone rubber).

The second cleaning part 60 may include a holder 66 for detachably mounting the second wiping member 61 to the second holding unit 62. The second wiping member 61 may be detachably attached to the holder 66. In FIG. 5, the second holding unit 62 illustrated in a simplified shape.

The second wiping member 61 includes a top surface 67, a first side surface 68, and a second side surface 69. The top surface 67 extends in both the first direction Y and the second direction X. The first side surface 68 and the second side surface 69 extend in the +Z direction from both ends of the top surface 67 in the second direction X. In particular, when the second cleaning part 60 includes the elastic body 65, or the second wiping member 61 is an elastic body, the top surface 67 is elastically deformable. The width of the top surface 67 in the second direction X is substantially the same as the width of the first protection surface 31 in the second direction X.

When the second wiping member 61 cleans the discharging head 23, the top surface 67 may come into contact with the discharging head 23 and the second holding unit 62 may move toward the nozzle surface 26 by a pressing distance. As a result, the second wiping member 61 is pressed against the discharging head 23 and elastically deformed. A longer pressing distance results in greater cleaning force for the discharging head 23. The pressing distance may be set in advance, or may be freely settable by the user.

When the second wiping member 61 cleans the discharging head 23, the second wiping member 61 and the discharging head 23 reciprocate relative to each other along the first direction Y. For example, with the second wiping member 61 being in contact with the discharging head 23, the discharging head 23 reciprocates along the first direction Y for a plurality of times. The movement amount of the forward path (backward path) in this process can be, for example, 1.0 mm or more. Alternatively, the second cleaning part 60 may reciprocate along the first direction Y with respect to the discharging head 23 for a plurality of times. By increasing the number of reciprocating times at this time, the discharging head 23 is cleaned more in detail. The number of reciprocating times may be preset, or may be freely set by the user. For cleaning a portion that is particularly contaminated or a portion where the contaminant is difficult to remove, the pressing distance may be made longer or the number of reciprocating times may be increased.

The direction in which the discharging head 23 and the second wiping member 61 reciprocate relative to each other is referred to as a wiping-off direction. The wiping-off direction corresponds to the first direction Y, and intersects, for example, is orthogonal to a wiping direction (second direction X) described below. Thus, the wiping-off can be regarded as lateral wiping, if the wiping of the nozzle surface 26 by the first wiping members 51 is vertical wiping.

FIG. 4 illustrates a height Ha of the first protection surfaces 31 and 41, a height Hb of the nozzle surface 26, and a height Hc of the upper end of the outer side surfaces 32 and 42. The "height" corresponds to a position in the third direction Z. The height Hb is positioned above the height Ha, and the height Hc is positioned above the height Hb.

When the wiping-off is performed on the first protection surfaces 31 and 41, the second cleaning part 60 moves in the −Z direction by the pressing distance, from the position where the top surface 67 is at the height Ha. The position of the second cleaning part 60 in a state where the top surface 67 is pressed against the protection surface 31 (or the protection surface 41) is referred to as a protection surface pressing position.

When the wiping-off is performed on the boundary surfaces 33 and 43, the second cleaning part 60 further moves in the −Z direction by the pressing distance, from the position where the top surface 67 is at the height Hb. The position of the second cleaning part 60 in a state where the top surface 67 is thus pressed against the boundary surface 33 (or the boundary surface 34) and the boundary region 26*a* (or the boundary region 26*b*) is referred to as a nozzle surface pressing position. The position of the top surface 67 in the third direction Z in the nozzle surface pressing position is higher than the position of the top surface 67 in the third direction Z in the protection surface pressing position. When the top surface 67 is at the protection surface pressing position, the top surface 67 is not in contact with most of the boundary surface 33 (boundary surface 34) or the boundary region 26*a* (or the boundary region 26*b*), and there is no gap between the top surface 67 and the second protection surface 41 (or the first protection surface 31).

When the wiping-off is performed on the outer side surface 32, the second cleaning part 60 is disposed at a position at which the second side surface 69 is in contact with the outer side surface 32. This position of the second cleaning part 60 is referred to an outer side surface position. The discharging head 23 further moves in the +X direction by the pressing distance, from the position at which the outer side surface 32 is in contact with the second side surface 69. The position of the discharging head 23 at the timing when the outer side surface 32 is thus pressed against the second side surface 69 is referred to as an outer side surface pressing position. The discharging head 23 at the outer side surface pressing position reciprocates along the first direction Y. Thus, the wiping-off is performed on the outer side surface 32.

Cleaning of Cover Member

When the second cover member 40 is cleaned by the second wiping member 61, the wiping-off is performed on the second boundary surface 43 and the second boundary region 26*b* by the second wiping member 61 at the same time (second boundary cleaning step). In the second boundary cleaning step, the second boundary surface 43 and the second boundary region 26*b* on which the wiping-off is performed by the second wiping member 61 are regions including the second boundary. The wiping-off may be performed on the second protection surface 41 by the second wiping member 61 at the same time as or after the second boundary cleaning step (second protection surface cleaning step).

When the first cover member 30 is cleaned by the second wiping member 61, the wiping-off may be performed on the first boundary surface 33 and the first boundary region 26*a* by the second wiping member 61 at the same time (first boundary cleaning step). In the first boundary cleaning step, the first boundary surface 33 and the first boundary region 26*a* on which the wiping-off is performed by the second wiping member 61 are regions including the first boundary.

The wiping-off may be performed on the first protection surface 31 by the second wiping members 61 at the same time as or after the first boundary cleaning step (first protection surface cleaning step). Furthermore, the wiping-off may be performed on the outer side surface 32 by the second wiping member 61. For example, the wiping-off may be performed on the outer side surface 32, the first protection surface 31, and the first boundary surface 33 in this order by the second wiping member 61.

Each time the cleaning of one of a plurality of cleaned parts (for example, the first protection surfaces 31 and 41 and the boundary surfaces 33 and 43) of the cover members 30 and 40 by the second wiping member 61 ends, the second cleaning part 60 may be separated from the discharging head 23 and move relative to the discharging head 23 to be in contact with the next cleaned part. More specifically, at least one of the second cleaning part 60 and the discharging head 23 moves to bring the second wiping member 61 in contact a certain cleaned part, and the discharging head 23 reciprocates along the first direction Y while being in contact with the second wiping member 61. In the series of operations, the relative movement along the first direction Y may be implemented by the movement of the discharging head 23. In the series of operations, the relative movement along the second direction X and the third direction Z may be implemented by the movement of the second cleaning part 60.

Maintenance Operation

A series of maintenance operations include, for example, cleaning, wiping, flushing, and wiping off. The cleaning is a maintenance operation for discharging bubbles and foreign matters in the discharging head 23 with liquid through the nozzles 25. The wiping is an example of cleaning in which the first wiping member 51 wipes the nozzle surface 26. The flushing is a maintenance operation in which the liquid is discharged from the nozzles 25. The wiping-off is an example of cleaning in which the liquid and the foreign matters adhered to the discharging head 23 are removed by the second cleaning part 60.

The details of the series of maintenance operations can be changed by the user input or the program. The series of maintenance operations may be performed before, during, or after the printing, for example. For example, during the printing, the series of maintenance operations may be performed at a constant interval.

After the cleaning, droplets or foreign matters (paper powder for example) may be adhered to the nozzle surface 26. Therefore, the wiping may be performed after the cleaning. By the wiping, the droplets and foreign matters adhered to the nozzle surface 26 are scraped off from the periphery of the nozzles 25. The liquid including the foreign matters scraped off by the wiping may remain around the cover members 30 and 40.

For example, when the wiping is performed with the first cleaning part 50 moving in the −X direction relative to the discharging head 23, the first cover member 30, the nozzle surface 26, and the second cover member 40 are cleaned in this order with the distal end of the first wiping member 51 elastically deforming. A movement direction of a portion of the first wiping member 51 in contact with the discharging head 23 during the wiping is referred to as a wiping direction.

The first wiping member 51 is manufactured by a material with poor liquid absorbability. Thus, the liquid including the foreign matters scraped off by the first wiping members 51 are collected toward the second cover member 40 located downstream in the wiping direction (−X direction). There is a step (second boundary) between the nozzle surface 26 and the second cover member 40, and thus the foreign matters collected by the wiping are likely to accumulate at this step portion.

The meniscus in the nozzles 25 may be disturbed after the wiping. Therefore, the flushing may be performed for discharging the liquid from the nozzles 25 after the wiping. Furthermore, after the wiping or the flushing, the wiping-off may be performed on the discharging head 23 by the second wiping member 61. The wiping-off may be performed by the second wiping member 61 mainly on the cover members 30 and 40 where the contaminants likely remain.

Figure 6:
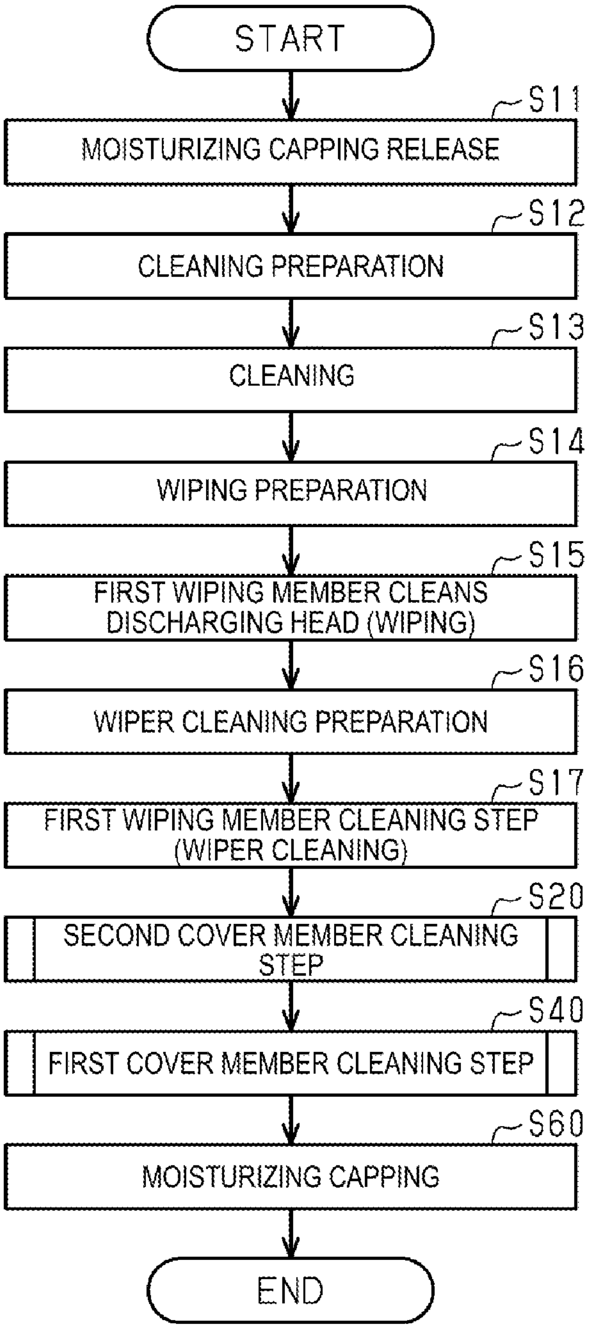
FIG. 6 is a flowchart illustrating a series of maintenance operations for the discharging head illustrated in FIG. 2.

FIG. 6 illustrates an example of a procedure of the series of maintenance operations. First of all, if the moisturizing capping is provided, the moisturizing capping is released (step S11). More specifically, the second cleaning part 60 moves in the +Z direction from the capping position to the second origin position, and thus the second cap 63 separates from the nozzle surface 26. FIG. 4 illustrates a state where the moisturizing capping has been thus released.

Figure 7:
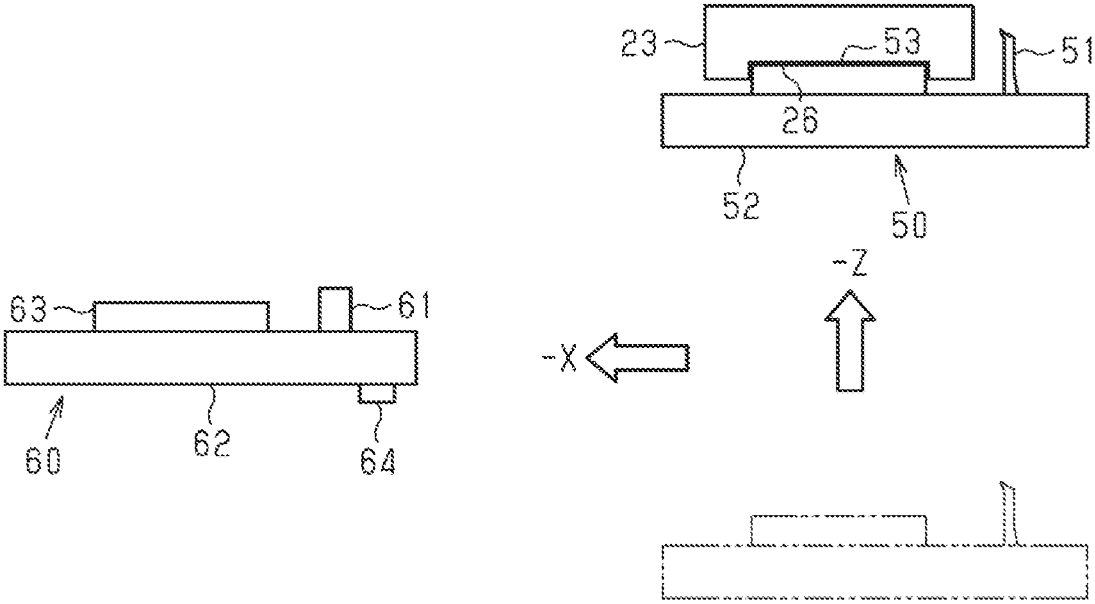
FIG. 7 is a schematic view illustrating an operation associated with cleaning preparation illustrated in FIG. 6.
Figure 8:
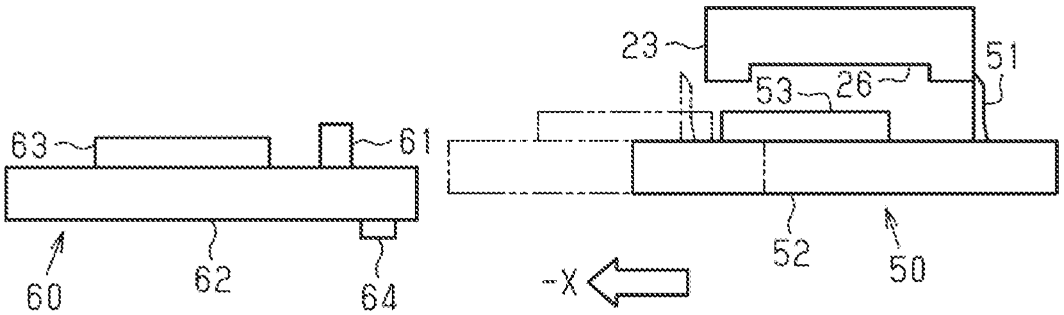
FIG. 8 is a schematic view illustrating wiping illustrated in FIG. 6.
Figure 9:
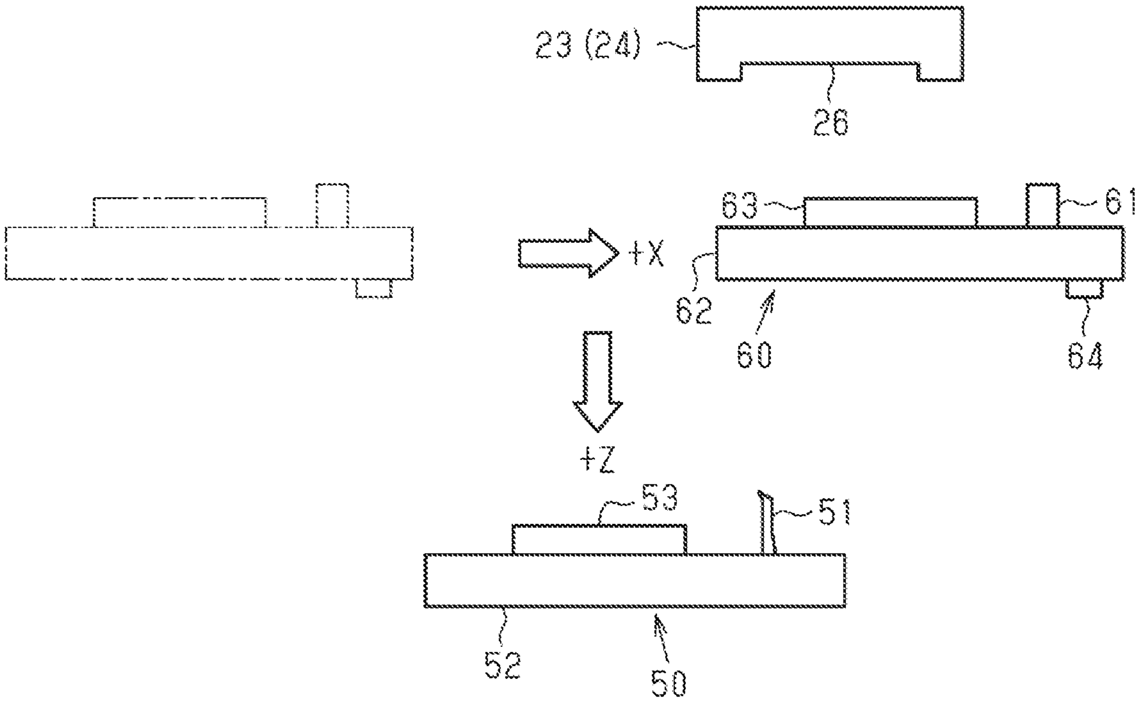
FIG. 9 is a schematic view illustrating an operation associated with wiper cleaning preparation illustrated in FIG. 6.
Figure 10:
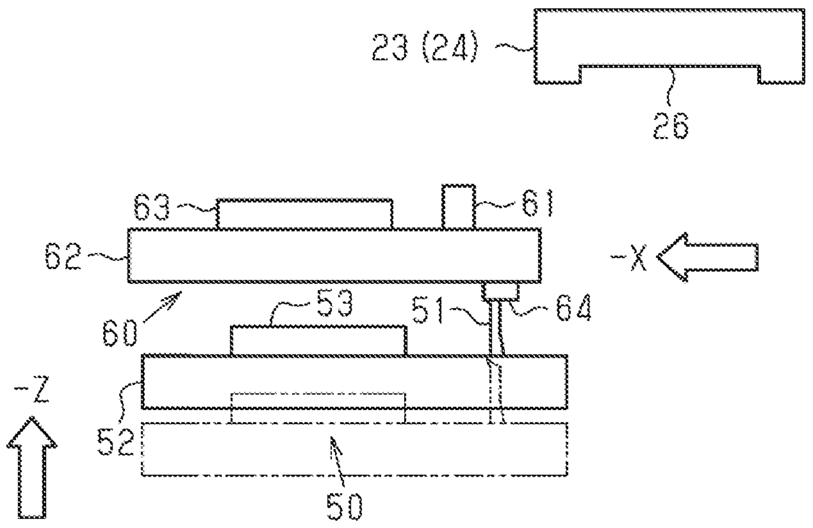
FIG. 10 is a schematic view illustrating wiper cleaning illustrated in FIG. 6.

Next, cleaning preparation is performed (step S12). More specifically, the second cleaning part 60 moves in the −X direction from the second origin position to the second retracted position as illustrated in FIG. 7. Then, the first cleaning part 50 moves in the −Z direction from the first origin position to the capping position. In the state with the capping thus provided, the cleaning is performed with the discharging head 23 discharging the liquid into the first cap 53 (step S13).

After the cleaning, wiping preparation is performed (step S14). More specifically, the first cleaning part 50 moves in the +Z direction and the −X direction from the capping position to a wiping start position indicated by a solid line in FIG. 8. The wiping start position is a position where the distal end of the first wiping member 51 comes into contact with the outer side surface 32 (see FIG. 4).

Then, the first wiping member 51 cleans the discharging head 23 (step S15). More specifically, the first cleaning part 50 moves in the −X direction from the wiping start position to a wiping end position indicated by a two-dot chain line in FIG. 8. In this process, the first wiping member 51 sequentially wipes the first cover member 30, the nozzle surface 26, and the second cover member 40 in this order (nozzle surface wiping step).

In the nozzle surface wiping step, for example, the first cleaning part 50 moves in the wiping direction (the −X direction) relative to the discharging head 23 not moving. In other words, in the nozzle surface wiping step, the discharging head 23 and the first cleaning part 50 move relative to each other, with the first wiping member 51 moving from the first end edge 27 (see FIG. 2) toward the second end edge 28 (see FIG. 2). Alternatively, the wiping may be performed with the discharging head 23 moving in the +X direction relative to the first cleaning part 50 not moving. Still alternatively, the wiping may be performed with both of the first cleaning part 50 and the discharging head 23 moving in directions opposite to each other.

After the wiping in step S15, wiper cleaning preparation may be performed (step S16). More specifically, first of all, the first cleaning part 50 moves in the +Z direction from the wiping end position to a first retracted position illustrated in FIG. 9. The first retracted position enables the passage of the second cleaning part 60 moving along the second direction X. Then, the second cleaning part 60 moves in the +X direction from the second retracted position to a cleaning start position indicated by a solid line in FIG. 9. Then, the first cleaning part 50 moves in the −Z direction from the first retracted position to the cleaned position indicated by a solid line in FIG. 10.

Then, the first wiping member 51 is cleaned by the cleaner 64 (step S17, first wiping member cleaning step). When the cleaning is performed by the cleaner 64, the first cleaning part 50 and the second cleaning part 60 move relative to each other along the second direction X. For example, the second cleaning part 60 moves in the −X direction relative to the first wiping member 51 not moving. Alternatively, the first cleaning part 50 may move in the +X direction relative to the cleaner 64 not moving, or both of the first cleaning part 50 and the cleaner 64 may move in opposite directions. The cleaning may be further performed with the relative movement directions in the second direction X of the cleaners 64 and the first cleaning part 50 inverted, or the reciprocating movement made by the alternate movement in the −X direction and the +X direction may be performed for a plurality of times. After step S17, the discharging head 23 may be returned to the home position, the first cleaning part 50 may be returned to the first origin position, and the second cleaning part 60 may be returned to the second origin position. The cleaner 64 may clean the first wiping member 51 before the wiping.

Then, the second wiping member 61 cleans the second cover member 40 (step S20, second cover member cleaning step). In the example illustrated in FIG. 6, the cleaning is first performed on the second cover member 40, which is, of the cover members 30 and 40, the one that is located more downstream in the wiping direction and thus is more likely to be contaminated. After cleaning the second cover member 40, the second wiping members 61 clean the first cover member 30 (step S40, first cover member cleaning step). This completes the cleaning of the discharging head 23.

When the printing is completed at this point, the moisturizing capping is provided (step S60), and the processing ends. More specifically, after the discharging head 23 moves to the home position, the second cleaning part 60 moves to the second origin position, and then the second cleaning part 60 moves to the capping position. Steps S11 and S60 may be omitted when the series of maintenance operations are performed during the printing.

After the wiping of step S15, the inspection to check whether the discharge failure is occurring may be performed using the inspection mechanism 21. Furthermore, when the discharge failure is detected by inspection, the cleaning, wiping, and inspection may be repeated again. With the wiping thus continuously performed for a plurality times, the wiper cleaning and cleaning for the cover members 30 and 40 may be after the final wiping.

Cleaning Method for Second Cover Member

Figure 11:
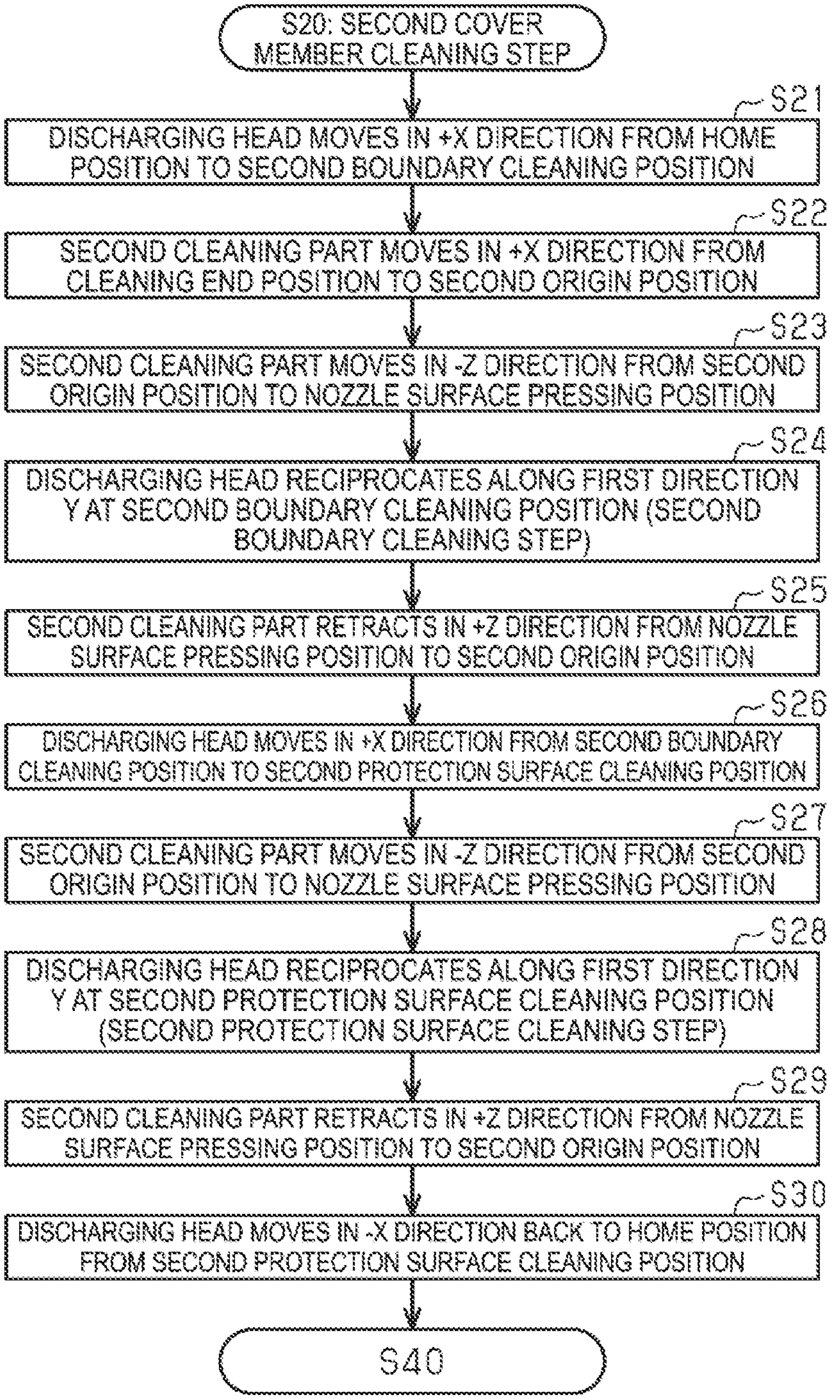
FIG. 11 is a flowchart illustrating cleaning for a second cover member illustrated in FIG. 6.

FIG. 11 illustrates details of the second cover member cleaning step in step S20. The first cleaning part 50 does not move from the second retracted position during steps S20 and S40, and thus the description thereof will be omitted herein.

First of all, the discharging head 23 moves in the +X direction from the home position illustrated in FIG. 4 to a second boundary cleaning position (step S21). As illustrated by a two-dot chain line in FIG. 12, the second boundary cleaning position is a position where the second boundary surface 43 and the second boundary region 26*b* are aligned with the top surface 67 of the second wiping member 61 in the third direction Z, when the second cleaning part 60 is at the second origin position. In other words, the second boundary cleaning position is a position where the second boundary surface 43 and the second boundary region 26*b* are directly above the top surface 67 when the second cleaning part 60 is at the second origin position.

Next, the second cleaning part 60 moves in the X direction from a cleaning end position to the second origin position (step S22). As a result, the second boundary surface 43 and the second boundary region 26*b* are disposed directly above the top surface 67. While the description herein is given on the step in a case where the second cleaning part 60 does not move to the second origin position after step S17 but stays at a location (cleaning end position) at the point when step S17 ends, when the second cleaning part 60 moves to the second origin position after step S17, step S22 is omitted. Then, the second cleaning part 60 moves in the −Z direction from the second origin position to the nozzle surface pressing position (step S23).

Figure 12:
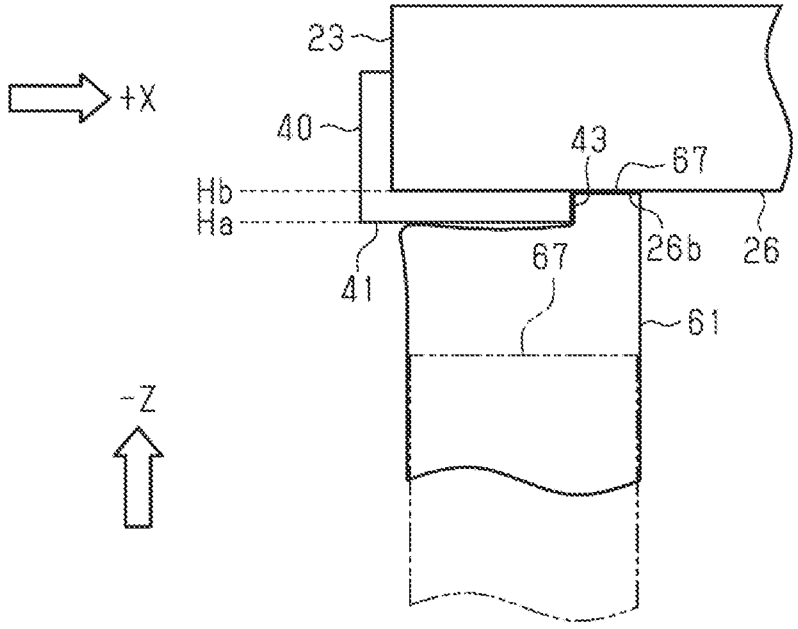
FIG. 12 is a schematic view illustrating a second boundary cleaning step illustrated in FIG. 11.
Figure 13:
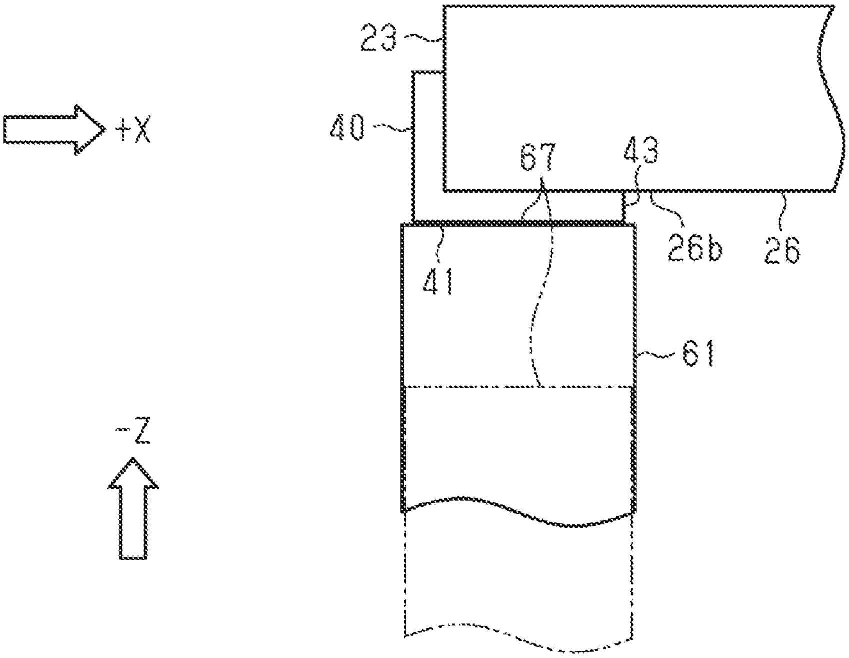
FIG. 13 is a schematic view illustrating a second protection surface cleaning step illustrated in FIG. 11.

In the process of reaching the nozzle surface pressing position, the second wiping members 61 are pressed against the discharging head 23, resulting in the elastic deformation of the top surface 67 as indicated by a solid line in FIG. 12. In this process, the second wiping member 61 is pressed against the second protection surface 41, the second boundary surface 43 and the second boundary region 26*b*. Depending on how the top surface 67 deforms, a gap may be formed between the top surface 67 and the second protection surface 41.

In this state, the discharging head 23 reciprocates along the first direction Y at the second boundary cleaning position, relative to the second cleaning part 60 for a plurality of times (for example, five times) (step S24). Thus, the wiping-off is performed on at least the second boundary surface 43 and the second boundary region 26*b* (second boundary cleaning step).

After step S24, the second cleaning part 60 retracts in the +Z direction from the nozzle surface pressing position to the second origin position (step S25). As a result, the second wiping member 61 is separated from the discharging head 23. Then, the discharging head 23 moves in the +X direction from the second boundary cleaning position to a second protection surface cleaning position illustrated FIG. 13 (step S26). The second protection surface cleaning position is a position at which the second protection surface 41 entirely faces the top surface 67 (indicated by a two-dot chain line in FIG. 13) in the third direction Z.

Then, the second cleaning part 60 moves in the −Z direction from the second origin position to the nozzle surface pressing position (step S27). As a result, the top surface 67 contacts the entire second protection surface 41, and the second wiping member 61 is pressed against the second protection surface 41. At the second protection surface cleaning position as described above, the top surface 67 largely overlaps with the second protection surface 41 and barely overlaps with the boundary region 26*b* as viewed in the Z direction, and thus no gap is produced between the top surface 67 and the second protection surface 41.

Then, the discharging head 23 reciprocates along the first direction Y at the second protection surface cleaning position for a plurality of times (for example, twice) (step S28). Thus, the entire second protection surface 41 is cleaned (second protection surface cleaning step). Even if there is a gap between the top surface 67 and the second protection surface 41 in the second boundary cleaning step, the entirety of the second protection surface 41 can be reliably cleaned in the second protection surface cleaning step. The number of reciprocating times of the discharging head 23 in the second protection surface cleaning step may be less than the number of reciprocating times of the discharging head 23 in the second boundary cleaning step.

After step S28, the second cleaning part 60 retracts in the +Z direction from the nozzle surface pressing position to the second origin position (step S29). As a result, the second wiping member 61 is separated from the discharging head 23. Then, the discharging head 23 moves in the −X direction to return to the home position from the second protection surface cleaning position (step S30). Note that after step S28, the second wiping member 61 may further clean the outer side surface 42.

Cleaning Method for First Cover Member

Figure 14:
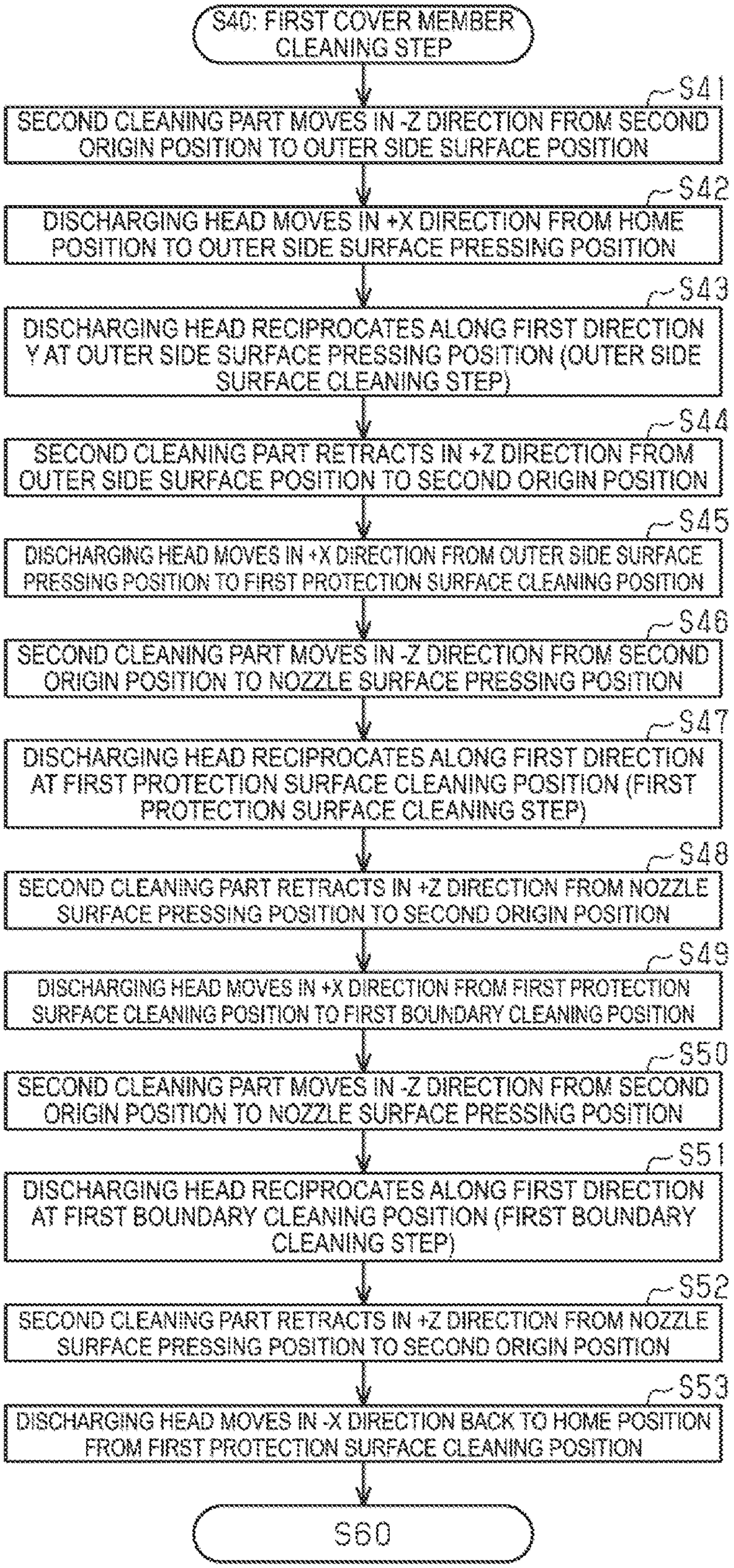
FIG. 14 is a flowchart illustrating cleaning for a first cover member illustrated in FIG. 6.

FIG. 14 illustrates details of the first cover member cleaning step in step S40.

Figure 15:
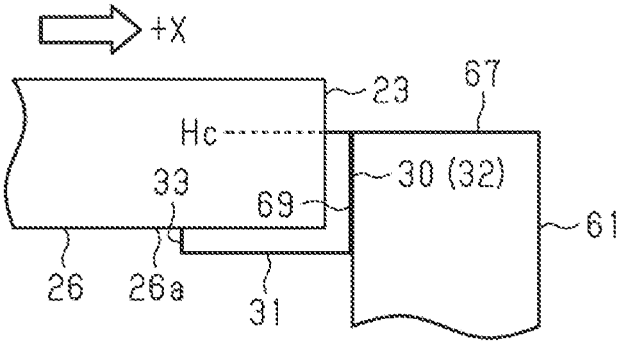
FIG. 15 is a schematic view illustrating an outer side surface cleaning step illustrated in FIG. 14.
Figure 16:
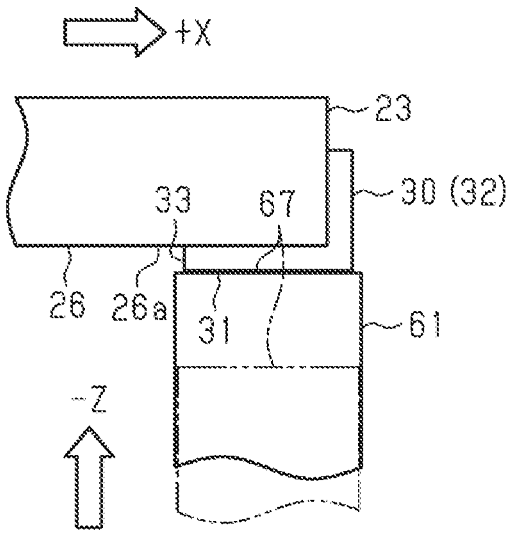
FIG. 16 is a schematic view illustrating a first protection surface cleaning step illustrated in FIG. 14.

First of all, the second cleaning part 60 moves in the −Z direction from the second origin position to the outer side surface position illustrated in FIG. 15 (step S41). Then, the discharging head 23 moves in the +X direction from the home position to the outer side surface pressing position (step S42). As a result, the outer side surface 32 is pressed against the second wiping member 61.

In this state, the discharging head 23 reciprocates for a plurality of times (three times example) along the first direction Y at the outer side surface pressing position (Step S43). Thus, the wiping-off is performed on the outer side surface 32 (outer side surface wiping step). As described above, the cleaning for the first cover member 30 includes the outer side surface wiping step for cleaning the outer side surface 32 with the second wiping members 61. The outer side surface 32 may have a contaminant adhered thereto, due to the contact with the first wiping members 51 at the start of the wiping. In view of this, the wiping-off may be performed. The outer side surface 42 located downstream in the wiping direction on the other hand is less likely to have the contaminant adhered thereto, and thus does not need to be cleaned.

Then, the second cleaning part 60 retracts in the +Z direction to the second origin position from the outer side surface position (step S44). As a result, the second wiping member 61 is separated from the discharging head 23. Then, the discharging head 23 moves in the +X direction from the outer side surface pressing position to a first protection surface cleaning position illustrated FIG. 16 (step S45). The first protection surface cleaning position is a position at which the first protection surface 31 entirely faces the top surface 67 (indicated by a two-dot chain line in FIG. 16) in the third direction Z.

Then, the second cleaning part 60 moves in the −Z direction from the second origin position to the nozzle surface pressing position (step S46). As a result, the top surface 67 contacts the entire first protection surface 31, and the second wiping member 61 is pressed against the first protection surface 31. At the first protection surface cleaning position as described above, the top surface 67 largely overlaps with the first protection surface 31 and barely overlaps with the boundary region 26*a* as viewed in the third direction Z, and thus no gap is produced between the top surface 67 and the first protection surface 31.

Then, the discharging head 23 reciprocates along the first direction Y at the first protection surface cleaning position for a plurality of times (for example, twice) (step S47). Thus, the wiping-off is performed on the first protection surface 31 (first protection surface cleaning step). The number of reciprocating times of the discharging head 23 in the first protection surface cleaning step may be less than the number of reciprocating times of the discharging head 23 in the outer side surface cleaning step.

After step S24, the second cleaning part 60 retracts in the +Z direction from the nozzle surface pressing position to the second origin position (step S48). As a result, the second wiping member 61 is separated from the discharging head 23. Then, the discharging head 23 moves in the +X direction from the first protection surface cleaning position to the first boundary cleaning position (step S49).

Figure 17:
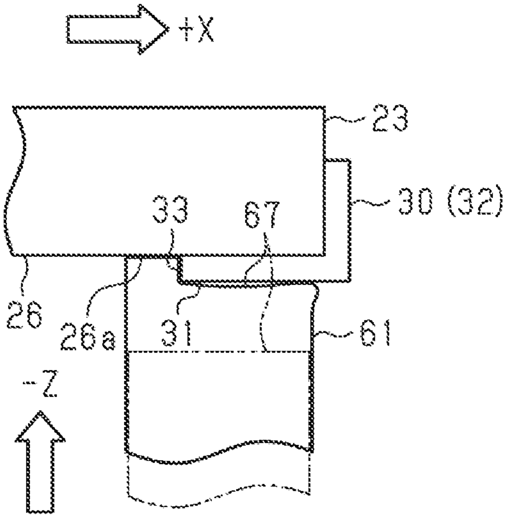
FIG. 17 is a schematic view illustrating a first boundary cleaning step illustrated in FIG. 14.

As illustrated by a two-dot chain line in FIG. 17, the first boundary cleaning position is a position where the first boundary surface 33 and the first boundary region 26*a* are aligned with the top surface 67 of the second wiping member 61 in the third direction Z, when the second cleaning part 60 is at the second origin position. In other words, the first boundary cleaning position is a position where the first boundary surface 33 and the first boundary region 26*a* are directly above the top surface 67 when the second cleaning part 60 is at the second origin position.

Then, the second cleaning part 60 moves in the −Z direction from the second origin position to the nozzle surface pressing position (step S50). In the process of reaching the nozzle surface pressing position, the second wiping members 61 are pressed against the discharging head 23, resulting in the elastic deformation of the top surface 67 as indicated by a solid line in FIG. 17. In this process, the second wiping members 61 are pressed against the first protection surface 31, the first boundary surface 33, and the first boundary region 26*a*. Depending how the top surface 67 deforms, a gap may be formed between the top surface 67 and the first protection surface 31.

In this state, the discharging head 23 reciprocates along the first direction Y at the first boundary cleaning position for a plurality of times (for example, five times) (step S51). Thus, the wiping-off is performed on at least the first boundary surface 33 and the first boundary region 26*a* (first boundary cleaning step).

Since the boundary portion includes corners difficult to clean, the number of reciprocating times of the discharging head 23 in the first boundary cleaning step may be greater than the number of reciprocating times of the discharging head 23 in the first protection surface cleaning step and the outer side surface cleaning step. In addition, when the second boundary is much more contaminated than the first boundary, the number of reciprocating times (10 times for example) of the discharging head 23 in the second boundary cleaning step may be set to be greater than the number of reciprocating times of the discharging head 23 in the first boundary cleaning step.

After step S51, the second cleaning part 60 retracts in the +Z direction from the nozzle surface pressing position to the second origin position (step S52). As a result, the second wiping member 61 is separated from the discharging head 23. Then, the discharging head 23 moves in the −X direction to return to the home position from the first protection surface cleaning position (step S53).

Actions of Embodiment

The second wiping member 61 capable of absorbing liquid needs to be replaced after being spent due to cleaning of the discharging head 23. If the second wiping member 61 is a roll sheet, the exchange frequency can be reduced, but a relatively large mechanism for feeding or winding the sheet is required. In this regard, the wiping member 61 is detachably attached to the second cleaning part 60, and thus can be installed in a relatively small space.

The second wiping member 61 is capable of absorbing the liquid, but when the contaminant on the discharging head 23 has viscosity increased due to drying or when the cleaned part is stepped, the contaminant may not be removable by simply pressing the second wiping members 61 against the cleaned part. Also in such a case, the contaminant can be removed with the second wiping member 61 reciprocating for a plurality of times. The removal can be implemented with particularly high efficiency with the second wiping member 61 reciprocating along the first direction Y in which the step extends.

A threshold number of times used (for example, 25 times) may be set for determining whether the second wiping member 61 has been spent. When the number of used times of the second wiping member 61 exceeds the threshold, the controller 100 may issue a message prompting the replacement at a predetermined interval, until the second wiping member 61 is exchanged. Instead of or in addition to this, the cleaning using the second wiping member 61 may be stopped when the number of used times of the second wiping member 61 largely exceeds the threshold (the times that are twice as large as the threshold for example).

In addition to the automatic cleaning with the cleaning unit 20 described above, a manual cleaning operation by a user or a technician may be performed. The controller 100 may issue a message prompting such a manual cleaning operation, at a predetermined interval. The predetermined interval at which the message is issued may be shortened (for example, halved), after the cleaning with the second wiping member 61 has stopped due to the number of times used largely exceeding the threshold until the second wiping member 61 is exchanged.

Effects of Exemplary Embodiment

The apparatus and the method described above can provide the following effects.

(1) Cleaning the second cover member 40 includes the second boundary cleaning step. With the second boundary cleaning step, the contaminants adhered to the step between the second cover member 40 and the nozzle surface 26, more specifically, the second boundary surface 43 and the second boundary region 26*b* can be removed.

(2) The second protection surface cleaning step is further performed after the second boundary cleaning step, so that the second protection surface 41 can be cleaned.

(3) The first cover member cleaning step includes the first protection surface cleaning step. The first protection surface 31 can be cleaned with the first protection surface cleaning step.

(4) The first cover member cleaning step includes the first boundary cleaning step performed after the first protection surface cleaning step. With the first boundary cleaning step, the contaminants adhered to the step between the first cover member 30 and the nozzle surface 26, more specifically, the first boundary surface 33 and the first boundary region 26*a* can be removed.

(5) Cleaning the first cover member 30 includes the outer side surface wiping step. With the outer side surface wiping step, the contaminant adhered to the outer side surface 32 can be removed.

(6) The discharging head 23 moves in the +X direction relative to the second wiping members 61, to clean each part of the cover members 30 and 40. Stopping accuracy of the discharging head 23 may vary between after the movement in the +X direction and after the movement in the −X direction. In this case, with the movement of the discharging head 23 in the second direction X for alignment between the discharging head 23 and the second wiping member 61 limited to the movement in the +X direction involving a higher stopping accuracy in movement of the discharging head 23 in the second direction X, the alignment with the second wiping member 61 can be more accurately performed.

(7) Since the second wiping member 61 is detachable from the second holding unit 62, the second wiping member 61 contaminated can be replaced with a new second wiping member 61.

(8) The first wiping member 51 is cleaned using the cleaner 64 after the wiping, and thus the contaminants adhered to the first wiping member 51 will not adhere to the discharging head 23 at the time of subsequent wiping.

Note that the above-described exemplary embodiment may be modified as the following modified examples. Moreover, any of the configurations in the exemplary embodiments and configurations in the following modified examples may optionally be combined or the configurations in the following modified examples may optionally be combined to each other.

First Modified Example

Figure 18:
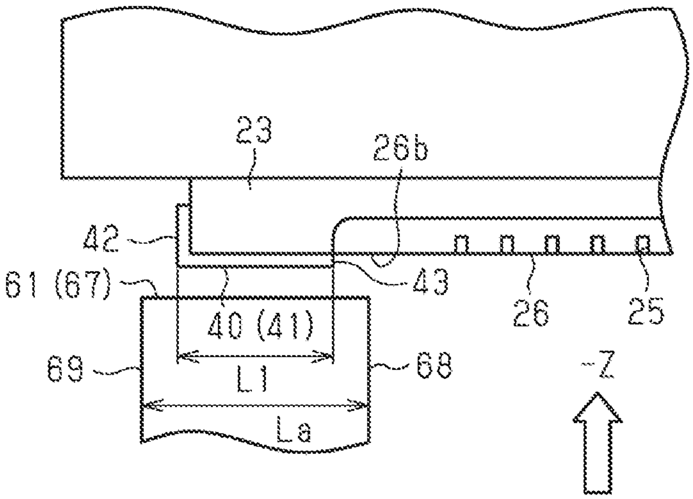
FIG. 18 is a schematic view of a first modified example of a second wiping member.

As in a first modified example illustrated in FIG. 18, a length La of the top surface 67 in the second direction X may be larger than a length L1 of the second protection surface 41 in the second direction X. Thus, La−L1>0 may be satisfied. In this case, the top surface 67 includes a margin portion that does not face the second protection surface 41 but faces the nozzle surface 26 in the second direction X, when the second cleaning part 60 is disposed with the outer side surface 42 and the side surface 69 being flush. The margin portion has a length La−L1 in the second direction X. In a state where such a margin portion exists, when the second cleaning part 60 moves in the −Z direction to the nozzle surface pressing position, the margin portion comes into contact with the boundary surface 33 and the boundary region 26*a*.

In this case, the discharging head 23 does not need to move along the second direction X between the second boundary cleaning step and the second protection surface cleaning step. Thus, step S26 can be omitted. Still, the second cleaning part 60 moves in the −Z direction from the second origin position to the protection surface pressing position in step S27. Thus, even if there is a gap between the top surface 67 and the second protection surface 41 in the second boundary cleaning step, the entirety of the second protection surface 41 can be reliably cleaned in the second protection surface cleaning step.

In the first modified example, the length La of the top surface 67 may be larger than the length L1 of the first protection surface 31 in the second direction X. In this case, the discharging head 23 does not need to move along the second direction X between the first protection surface cleaning step and the first boundary cleaning step. Thus, step S49 can be omitted. Still, the second cleaning part 60 moves in the −Z direction from the second origin position to the protection surface pressing position in step S46. Thus, even if there is a gap between the top surface 67 and the first protection surface 31 in the second boundary cleaning step, the entirety of the first protection surface 31 can be reliably cleaned in the first protection surface cleaning step. The first protection surface 31 and the second protection surface 41 may have the same length or different lengths.

Second Modified Example

Figure 19:
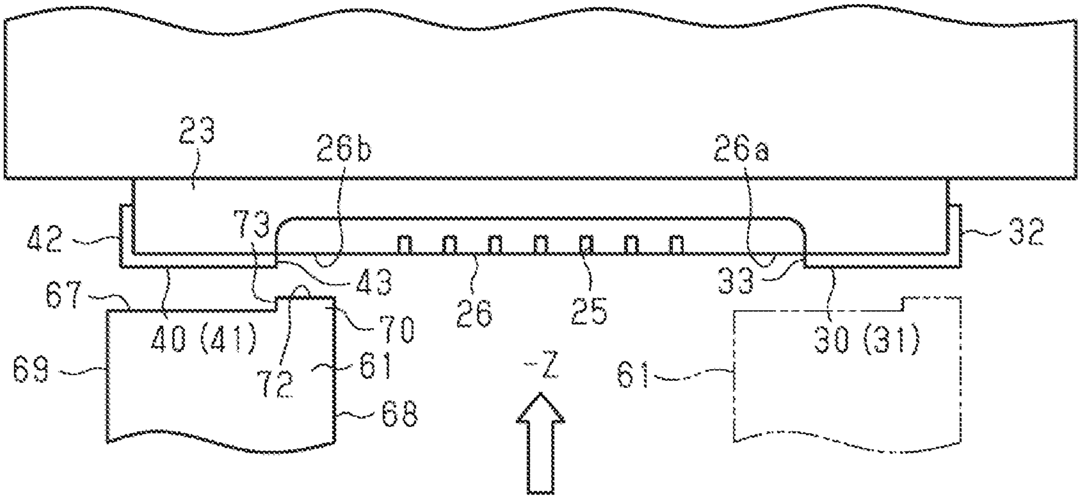
FIG. 19 is a schematic view illustrating a second modified example of the second wiping member.

As in a second modified example illustrated in FIG. 19, the second wiping member 61 may include a stepped protrusion 70 that has a quadrangular outer shape and protrudes from the top surface 67 in the −Z direction. The stepped protrusion 70 includes a side surface serving as part of the first side surface 68, and corners conforming to shapes of the nozzle surface 26 (second boundary region 26*b*), the second boundary surface 43, and the second protection surface 41. More specifically, the stepped protrusion 70 includes a top surface 72 extending along the second boundary region 26*b* and an intersection surface 73 extending along the second boundary surface 43. A corner is also formed at an intersection portion between the top surface 67 and the stepped protrusion 70. In the second boundary cleaning step, the second boundary surface 43, and the second protection surface 41, the discharging head 23 may reciprocate along the first direction Y, in a state where the stepped protrusion 70 is in contact with the second boundary region 26*b*.

In the second modified example, the second boundary region 26*b*, the second boundary surface 43, and the second protection surface 41 can be cleaned at once with the first stepped protrusion 70, and thus the cleaning needs not to be performed through two stages including the second boundary cleaning step and the second protection surface cleaning step. Still, the second cleaning part 60 moves in the −Z direction from the second origin position to the protection surface pressing position in step S23. In a second modified example, at the protection surface pressing position, the top surface 67 and the entirety of the second protection surface 41 are in contact with each other with no gap in between, the top surface 72 of the stepped protrusion 70 and the second boundary region 26*b* are in contact with each other, and the intersection surface 73 of the stepped protrusion 70 and the second boundary surface 43 are in contact with each other.

Also, the stepped protrusion 70 may include a corner conforming to the shapes of the first boundary region 26*a* and the first boundary surface 33. More specifically, when the top surface 72 of the stepped protrusion 70 is in contact with the second boundary region 26*b*, the side surface 68 continuous with the top surface 72 may be in contact with the first boundary surface 33. When the first cover member 30 is cleaned, the first boundary cleaning step may be performed after the first protection surface cleaning step. In the first protection surface cleaning step, as indicated by a two-dot chain line in FIG. 19, in a state where the top surface 67 faces the first boundary surface 33 and top surface 67 and the top surface 72 face the first protection surface 31, the second cleaning part 60 may move in the −Z direction to press the top surface 67 and the stepped protrusion 70 onto the first protection surface 31 in such a manner as to crush the stepped protrusion 70. Alternatively, in the first protection surface cleaning step, as indicated by a two-dot chain line in FIG. 20, only the top surface 67 may be pressed against the first protection surface 31 without bringing the stepped protrusion 70 into contact with the first protection surface 31.

Figure 20:
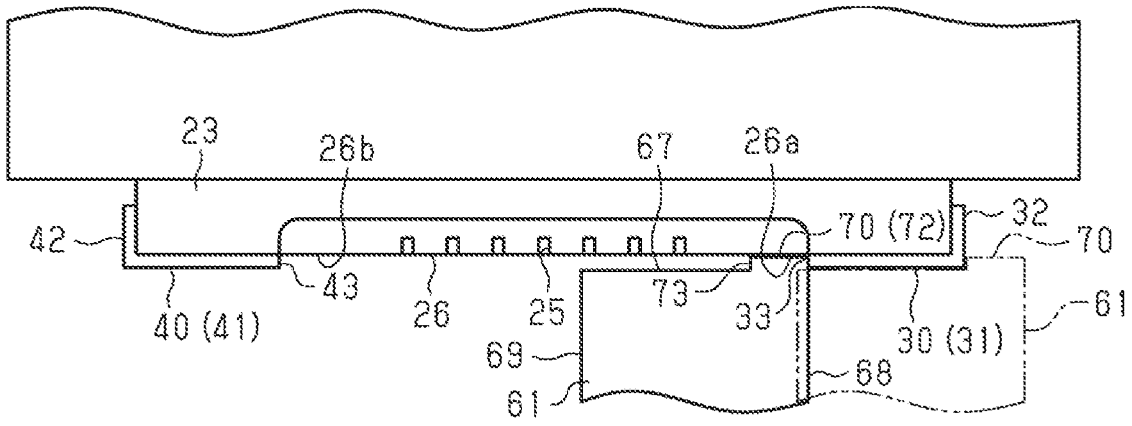
FIG. 20 is a schematic view illustrating a cleaning method for a first cover member with the second wiping member illustrated in FIG. 19.

In the first boundary cleaning step of the second modified example, as indicated by a solid line in FIG. 20, in a state where the top surface 72 of the stepped protrusion 70 is in contact with the first boundary region 26*a* and also the side surface 68 is in contact with the first boundary surface 33, the discharging head 23 may reciprocate along the first direction Y.

Third Modified Example

Figure 21:
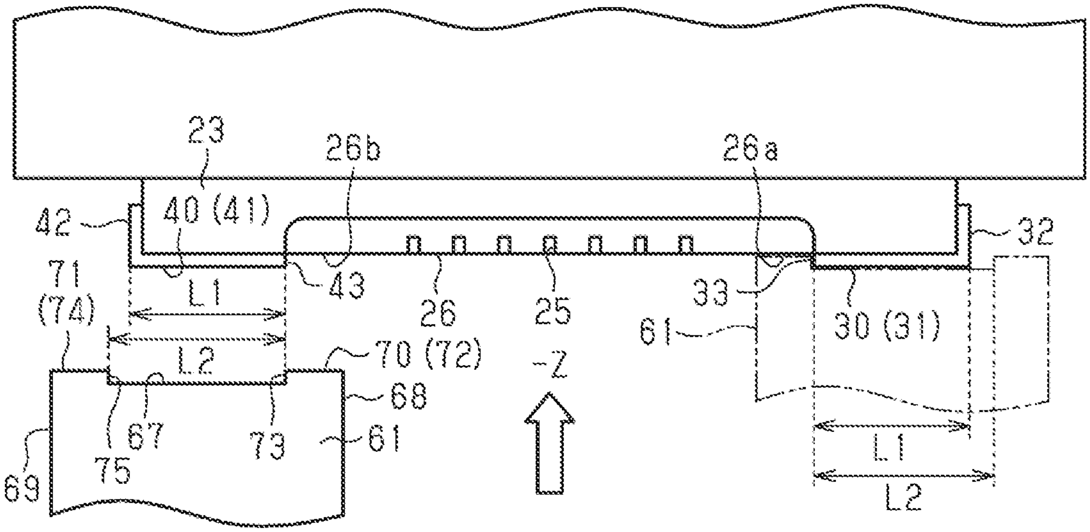
FIG. 21 is a schematic view illustrating a third modified example of the second wiping member.

As in a third modified example illustrated in FIG. 21, the second wiping member 61 may include the first stepped protrusion 70 having a quadrangular shape and a second stepped protrusion 71 having a quadrangular outer shape. Each of the stepped protrusions 70 and 71 protrudes in the −Z direction from both ends of the top surface 67 in the second direction X. The first stepped protrusion 70 includes a side surface serving part of the first side surface 68, and corners conforming to the shapes of the nozzle surface 26 (second boundary region 26*b*), the second boundary surface 43, and the second protection surface 41. More specifically, the first stepped protrusion 70 includes the first top surface 72 extending along the second boundary region 26*b* and the first intersection surface 73 extending along the second boundary surface 43. A corner is also formed at an intersection portion between the top surface 67 and the first intersection surface 73.

The second stepped protrusion 71 includes a side surface serving part of the second side surface 69, and corners conforming to the nozzle surface 26 (first boundary region 26*a*), the first boundary surface 33, and the first protection surface 31. A corner is also formed at an intersection portion between the top surface 67 and the second stepped protrusion 71. More specifically, the second stepped protrusion 71 includes a second top surface 74 extending along the first boundary region 26*a* and a second intersection surface 75 extending along the first boundary surface 33.

As illustrated in FIG. 21, a distance L2 between the first stepped protrusion 70 and the second stepped protrusion 71 in the second direction X (the length of the top surface 67 in the second direction X) may be longer than the length L1 of the first protection surface 31 (second protection surface 41) in the second direction X. In the second boundary cleaning step, the second boundary surface 43, and the second protection surface 41, the discharging head 23 may reciprocate along the first direction Y, in a state where each of the first top surface 72, the first intersection surface 73, and the top surface 67 is in contact with the second boundary region 26*b*. Still, the second cleaning part 60 moves in the −Z direction from the second origin position to the protection surface pressing position in step S23 as in the second modified example.

In the third modified example, the second boundary region 26*b*, the second boundary surface 43, and the second protection surface 41 can be cleaned at once with the second wiping member 61 including the first stepped protrusion 70, and thus the cleaning needs not to be performed through two stages including the second boundary cleaning step and the second protection surface cleaning step.

In the third modified example, in the first boundary cleaning step to clean the portion around the first boundary of the first cover member 30, the discharging head 23 may reciprocate along the first direction Y with the second top surface 74, the second intersection surface 75, and the top surface 67 being in contact with the first boundary region 26*a*, the first boundary surface 33, and the first protection surface 31, respectively. Still, the second cleaning part 60 moves in the −Z direction from the second origin position to the protection surface pressing position in step S50 as in the second protection surface cleaning step.

In the third modified example, the first boundary region 26*a*, the first boundary surface 33, and the first protection surface 31 can be cleaned at once with the second wiping member 61 including the second stepped protrusion 71, and thus the cleaning needs not to be performed through two stages including the first boundary cleaning step and the first protection surface cleaning step.

Other Modified Examples

The first cleaning part 50 may not include the first caps 53.

The second cleaning part 60 may not include the second caps 63.

The second cleaning part 60 may not include the cleaners 64.

While the second cleaning part 60 moves in the −Z direction to the same destination, that is, the nozzle surface pressing position in step S23 and step S27, the second cleaning part 60 may move in the −Z direction to the position, for example, the protection surface pressing position in step S27 that is different from the movement destination in step S23. Similarly, while the second cleaning part 60 moves in the −Z direction to the same destination, that is, the nozzle surface pressing position in step S46 and step S50, the second cleaning part 60 may move in the −Z direction to the position, for example, the protection surface pressing position in step S50 that is different from the movement destination in step S46.

The first direction Y may not be the width direction of the medium 10, and may be, for example, the conveyance direction of the medium 10, or may be the printing direction.

The second direction X may not be the printing direction, and may be, for example, the conveyance direction of the medium 10, or may be the width direction of the medium 10.

The discharging direction may not be downward, and may be obliquely downward for example.

The printing apparatus 11 may be a liquid discharging apparatus that discharges liquid other than ink. The state of the liquid discharged from the liquid discharging apparatus in a form of a minute amount of droplet is assumed to include a particulate form, a teardrop form, and a thread like extending form. This liquid may any material that can be discharged from the liquid discharging apparatus. For example, the liquid may be any matter in a state of being in a liquid phase, and is assumed to include a liquid body having high or low viscosity, as well as a fluid body such as sol, gel water, other inorganic solvents, an organic solvent, a solution, a liquid resin, a liquid metal, and a metal melt. The liquid includes not only liquid as a single state of the substance, but also includes particles of a functional material made of a solid such as pigment or metal particles dissolved in a solvent, dispersed or mixed in a solvent, and the like. Typical examples of the liquid include ink described in the embodiment above, liquid crystal, and the like. This ink is assumed to include a general aqueous ink and a solvent ink, as well various liquid compositions such as gel ink and hot-melt ink. Examples of the liquid discharging apparatus include an apparatus that discharges liquid including, in a dispersed or dissolved form, a material such as an electrode material and a color material used in manufacture of liquid crystal displays, electroluminescent displays, surface emitting displays, color filters and the like in a dispersed or dissolved form. The liquid discharging apparatus may be an apparatus discharging bioorganic substances used for biochip manufacturing, an apparatus used as a precision pipette and discharging liquid to be a sample, a printing apparatus, a micro dispenser, or the like. The liquid discharging apparatus may be an apparatus discharging lubricant to a precision machine such as a clock or a camera in a pinpoint manner, or an apparatus discharging transparent resin liquid such as ultraviolet curing resin or the like on a substrate for forming a tiny hemispherical lens, optical lens, or the like used for an optical communication element and the like. The liquid discharging apparatus may be an apparatus discharging etching liquid such as an acid or an alkali for etching a substrate or the like.

Hereinafter, technical concepts and effects thereof that are understood from the above-described embodiments and modified examples will be described.

1) In a cleaning method for a discharging head of a printing apparatus, the printing apparatus including the discharging head configured to discharge liquid onto a medium moving relative to the discharging head, a first cleaning part configured to clean the discharging head, and a second cleaning part configured to clean the discharging head, the discharging head including a head body including a nozzle surface in which a plurality of nozzles configured to discharge the liquid are opened, the nozzle surface including a first end edge and a second end edge and the plurality of nozzles being positioned between the first end edge and the second end edge, a first cover member attached to the head body and covering the first end edge, and a second cover member attached to the head body and covering the second end edge, the nozzle surface including a first boundary being a boundary with the first cover member and a second boundary being a boundary with the second cover member, the first boundary and the second boundary extending in a first direction, the second cleaning part including a second wiping member configured to absorb the liquid and a second holding unit configured to hold the second wiping member, the first cleaning part including a first wiping member made of a material with lower absorbability for the liquid than that of the second wiping member and a first holding unit configured to hold the first wiping member, the cleaning method includes: a nozzle surface wiping step for wiping the first cover member, the nozzle surface, and the second cover member by the first wiping member, with the discharging head and the first cleaning part moving relative to each other, and a second cover member cleaning step for cleaning the second cover member by the second wiping member, with the discharging head and the second cleaning part reciprocating relative to each other along the first direction, wherein the second cover member cleaning step includes a second boundary cleaning step for cleaning a region including the second boundary by the second wiping member.

With this cleaning method, the discharging head and the second cleaning part reciprocate relative to each other along a direction in which the second boundary extends, so that contaminants adhered to the region including the second boundary can be removed by the second wiping member. Thus, contaminants adhered to a non-planar portion of the discharging head can be removed.

2) The cleaning method for a discharging head according to 1), wherein the second cover member includes a second protection surface protruding beyond the nozzle surface and the second cover member cleaning step further includes, after the second boundary cleaning step, a second protection surface cleaning step for cleaning the second protection surface by the second wiping member.

With this cleaning method, the second protection surface can be cleaned by the second wiping member.

3) The cleaning method for a discharging head according to 2), wherein the second protection surface extends in a second direction intersecting the first direction, the second wiping member includes a top surface extending in both the first direction and the second direction, the top surface is elastically deformable, and a length of the top surface in the second direction is larger than a length of the second protection surface in the second direction.

With this cleaning method, the second protection surface can be cleaned with the top surface larger than the second protection surface.

4) The cleaning method for a discharging head according to 1), wherein the second cover member includes a second protection surface protruding beyond the nozzle surface and a second boundary surface extending between the second protection surface and the nozzle surface, the second wiping member includes a stepped protrusion including a corner in a shape conforming to the nozzle surface, the second boundary surface, and the second protection surface, and in the second boundary cleaning step, the discharging head and the second cleaning part reciprocate relative to each other along the first direction, with the stepped protrusion being in contact with the nozzle surface, the second boundary surface, and the second protection surface.

With this cleaning method, the nozzle surface, the second boundary surface, and the second protection surface can be cleaned at once with the stepped protrusion.

5) The cleaning method for a discharging head according to 1), wherein the first cover member includes a first protection surface protruding beyond the nozzle surface and a first boundary surface extending between the first protection surface and the nozzle surface, the second cover member includes a second protection surface protruding beyond the nozzle surface and a second boundary surface extending between the second protection surface and the nozzle surface, the second wiping member includes a first stepped protrusion including a corner in a shape conforming to the nozzle surface, the second boundary surface, and the second protection surface and a second stepped protrusion including a corner in a shape conforming to the nozzle surface, the first boundary surface, and the first protection surface, the second protection surface extends in a second direction intersecting the first direction, a distance between the first stepped protrusion and the second stepped protrusion in the second direction is larger than a length of the second protection surface in the second direction, and in the second boundary cleaning step, the discharging head and the second cleaning part reciprocate relative to each other along the first direction, with the first stepped protrusion being in contact with the nozzle surface, the second boundary surface, and the second protection surface.

With this cleaning method, the nozzle surface, the second boundary surface, and the second protection surface can be cleaned at once with the first stepped protrusion.

6) The cleaning method for a discharging head according to any one of 1) to 5), the cleaning method further including, after the second cover member cleaning step, a first cover member cleaning step for cleaning the first cover member by the second wiping member, with the discharging head and the second cleaning part reciprocating relative to each other along the first direction.

With this cleaning method, the second cover member and the first cover member can be sequentially cleaned.

7) The cleaning method for a discharging head according to 2), wherein the first cover member includes a first protection surface protruding beyond the nozzle surface, the cleaning method further includes, after the second cover member cleaning step, a first cover member cleaning step for cleaning the first cover member by the second wiping member, with the discharging head and the second cleaning part reciprocating relative to each other along the first direction, and the first cover member cleaning step includes a first protection surface cleaning step for cleaning the first protection surface by the second wiping member and after the first protection surface cleaning step, a first boundary cleaning step for cleaning a region including the first boundary by the second wiping member.

With this cleaning method, the first protection surface and the region including the first boundary can be cleaned sequentially with the second wiping member.

8) The cleaning method for a discharging head according to 3), wherein the first cover member includes a first protection surface protruding beyond the nozzle surface, a length of the top surface in the second direction is larger than a length of the first protection surface in the second direction, the cleaning method further includes, after the second cover member cleaning step, a first cover member cleaning step for cleaning the first cover member by the second wiping member, with the discharging head and the second cleaning part reciprocating relative to each other along the first direction, and the first cover member cleaning step includes a first boundary cleaning step for cleaning a region including the first boundary by the second wiping member and after the first boundary cleaning step, a first protection surface cleaning step for cleaning the first protection surface by the second wiping member.

With this cleaning method, the first protection surface can be cleaned with the top surface larger than the first protection surface.

9) The cleaning method for a discharging head according to 4), wherein the first cover member includes a first protection surface protruding beyond the nozzle surface and a first boundary surface extending between the first protection surface and the nozzle surface, the cleaning method further includes, after the second cover member cleaning step, a first cover member cleaning step for cleaning the first cover member by the second wiping member, with the discharging head and the second cleaning part reciprocating relative to each other along the first direction, the first cover member cleaning step includes a first protection surface cleaning step for cleaning the first protection surface by the second wiping member and after the first protection surface cleaning step, a first boundary cleaning step for cleaning a region including the first boundary by the second wiping member, and in the first boundary cleaning step, the discharging head and the second cleaning part reciprocate relative to each other along the first direction, with the stepped protrusion being in contact with the nozzle surface and the first boundary surface.

With this cleaning method, the nozzle surface and the first boundary surface can be cleaned with the stepped protrusion.

10) The cleaning method for a discharging head according to 5), wherein the first protection surface extends in a second direction intersecting the first direction, a distance between the first stepped protrusion and the second stepped protrusion in the second direction is larger than a length of the first protection surface in the second direction, the cleaning method further includes, after the second cover member cleaning step, a first cover member cleaning step for cleaning the first cover member by the second wiping member, with the discharging head and the second cleaning part reciprocating relative to each other along the first direction, the first cover member cleaning step includes a first boundary cleaning step for cleaning a region including the first boundary by the second wiping member, and in the first boundary cleaning step, the discharging head and the second cleaning part reciprocate relative to each other along the first direction, with the second stepped protrusion being in contact with the nozzle surface and the first boundary surface.

With this cleaning method, the nozzle surface and the first boundary surface can be cleaned with the second stepped protrusion.

11) The cleaning method for a discharging head according to any one of 6) to 10), wherein the discharging head includes a side wall intersecting the nozzle surface, the first cover member includes an outer side surface extending along the side wall, and the first cover member cleaning step includes an outer side surface wiping step for cleaning the outer side surface by the second wiping member.

With this cleaning method, the outer side surface can be cleaned by the second wiping member.

12) The cleaning method for a discharging head according to any one of 1) to 11), wherein in the nozzle surface wiping step, the first cleaning part moves relative to the discharging head, with the first wiping member moving from the first end edge toward the second end edge.

With this cleaning method, contaminants accumulated around the second cover member covering the second end edge as a result of the nozzle surface wiping step can be removed with the second boundary cleaning step.

13) The cleaning method for a discharging head according to any one of 1) to 12), wherein in the second cover member cleaning step, the discharging head reciprocates relative to the second cleaning part.

With this cleaning method, the region including the second boundary can be cleaned with the discharging head reciprocating.

14) The cleaning method for a discharging head according to any one of 1) to 13), wherein the second cleaning part includes a holder detachably mounted to the second holding unit and the second wiping member is detachably attached to the holder.

With this cleaning method, the second wiping member can be easily exchanged.

15) The cleaning method for a discharging head according to any one of 1) to 14), wherein the second cleaning part includes a cleaner with which the first wiping member is cleaned, the second holding unit holds the second wiping member on a first side and holds the cleaner on a second side opposite to the first side, a second direction intersecting the first direction is a direction along the nozzle surface, a third direction intersecting both the first direction and the second direction is a direction intersecting the nozzle surface, the first holding unit and the second holding unit are each configured to individually reciprocate in both the second direction and the third direction, and the cleaning method further includes, after the nozzle surface wiping step, a first wiping member cleaning step for cleaning the first wiping member by the cleaner, with the first holding unit and the second holding unit moving relative to each other along the second direction.

In this cleaning method, the first wiping member is cleaned with the cleaner, so that readhesion of the contaminant that has been removed by the first wiping member to the discharging head can be suppressed.

What is claimed is:

1. A cleaning method for a discharging head of a printing apparatus, the printing apparatus including:

the discharging head configured to discharge liquid onto a medium moving relative to the discharging head, a first cleaning part configured to clean the discharging head, and a second cleaning part configured to clean the discharging head, the discharging head including:

a head body including a nozzle surface in which a plurality of nozzles configured to discharge the liquid are opened, the nozzle surface including a first end edge and a second end edge and the plurality of nozzles being positioned between the first end edge and the second end edge, a first cover member attached to the head body and covering the first end edge, and a second cover member attached to the head body and covering the second end edge, the nozzle surface including a first boundary being a boundary with the first cover member and a second boundary being a boundary with the second cover member, the first boundary and the second boundary extending in a first direction, the second cleaning part including:

a second wiping member configured to absorb the liquid and a second holding unit configured to hold the second wiping member, the first cleaning part including:

a first wiping member made of a material with lower absorbability for the liquid than that of the second wiping member and a first holding unit configured to hold the first wiping member, the method comprising:

a nozzle surface wiping step for wiping the first cover member, the nozzle surface, and the second cover member by the first wiping member, with the discharging head and the first cleaning part moving relative to each other; and a second cover member cleaning step for cleaning the second cover member by the second wiping member, with the discharging head and the second cleaning part reciprocating relative to each other along the first direction, wherein the second cover member cleaning step includes a second boundary cleaning step for cleaning a region including the second boundary by the second wiping member.

2. The cleaning method for a discharging head according to claim 1, wherein the second cover member includes a second protection surface protruding beyond the nozzle surface and the second cover member cleaning step further includes, after the second boundary cleaning step, a second protection surface cleaning step for cleaning the second protection surface by the second wiping member.

3. The cleaning method for a discharging head according to claim 2, wherein the second protection surface extends in a second direction intersecting the first direction, the second wiping member includes a top surface extending in both the first direction and the second direction, the top surface is elastically deformable, and a length of the top surface in the second direction is larger than a length of the second protection surface in the second direction.

4. The cleaning method for a discharging head according to claim 3, wherein the first cover member includes a first protection surface protruding beyond the nozzle surface, a length of the top surface in the second direction is larger than a length of the first protection surface in the second direction, the cleaning method further includes, after the second cover member cleaning step, a first cover member cleaning step for cleaning the first cover member by the second wiping member, with the discharging head and the second cleaning part reciprocating relative to each other along the first direction, and the first cover member cleaning step includes:

a first boundary cleaning step for cleaning a region including the first boundary by the second wiping member and after the first boundary cleaning step, a first protection surface cleaning step for cleaning the first protection surface by the second wiping member.

5. The cleaning method for a discharging head according to claim 2, wherein the first cover member includes a first protection surface protruding beyond the nozzle surface, the cleaning method further includes, after the second cover member cleaning step, a first cover member cleaning step for cleaning the first cover member by the second wiping member, with the discharging head and the second cleaning part reciprocating relative to each other along the first direction, and the first cover member cleaning step includes:

a first protection surface cleaning step for cleaning the first protection surface by the second wiping member and after the first protection surface cleaning step, a first boundary cleaning step for cleaning a region including the first boundary by the second wiping member.

6. The cleaning method for a discharging head according to claim 1, wherein the second cover member includes a second protection surface protruding beyond the nozzle surface and a second boundary surface extending between the second protection surface and the nozzle surface, the second wiping member includes a stepped protrusion including a corner in a shape conforming to the nozzle surface, the second boundary surface, and the second protection surface, and in the second boundary cleaning step, the discharging head and the second cleaning part reciprocate relative to each other along the first direction, with the stepped protrusion being in contact with the nozzle surface, the second boundary surface, and the second protection surface.

7. The cleaning method for a discharging head according to claim 6, wherein the first cover member includes a first protection surface protruding beyond the nozzle surface and a first boundary surface extending between the first protection surface and the nozzle surface, the cleaning method further includes, after the second cover member cleaning step, a first cover member cleaning step for cleaning the first cover member by the second wiping member, with the discharging head and the second cleaning part reciprocating relative to each other along the first direction, the first cover member cleaning step includes:

a first protection surface cleaning step for cleaning the first protection surface by the second wiping member and after the first protection surface cleaning step, a first boundary cleaning step for cleaning a region including the first boundary by the second wiping member, and in the first boundary cleaning step, the discharging head and the second cleaning part reciprocate relative to each other along the first direction, with the stepped protrusion being in contact with the nozzle surface and the first boundary surface.

8. The cleaning method for a discharging head according to claim 1, wherein the first cover member includes a first protection surface protruding beyond the nozzle surface and a first boundary surface extending between the first protection surface and the nozzle surface, the second cover member includes a second protection surface protruding beyond the nozzle surface and a second boundary surface extending between the second protection surface and the nozzle surface, the second wiping member includes:

a first stepped protrusion including a corner in a shape conforming to the nozzle surface, the second boundary surface, and the second protection surface and a second stepped protrusion including a corner in a shape conforming to the nozzle surface, the first boundary surface, and the first protection surface, the second protection surface extends in a second direction intersecting the first direction, a distance between the first stepped protrusion and the second stepped protrusion in the second direction is larger than a length of the second protection surface in the second direction, and in the second boundary cleaning step, the discharging head and the second cleaning part reciprocate relative to each other along the first direction, with the first stepped protrusion being in contact with the nozzle surface, the second boundary surface, and the second protection surface.

9. The cleaning method for a discharging head according to claim 8, wherein the first protection surface extends in a second direction intersecting the first direction, a distance between the first stepped protrusion and the second stepped protrusion in the second direction is larger than a length of the first protection surface in the second direction, the cleaning method further includes, after the second cover member cleaning step, a first cover member cleaning step for cleaning the first cover member by the second wiping member, with the discharging head and the second cleaning part reciprocating relative to each other along the first direction, the first cover member cleaning step includes a first boundary cleaning step for cleaning a region including the first boundary by the second wiping member, and in the first boundary cleaning step, the discharging head and the second cleaning part reciprocate relative to each other along the first direction, with the second stepped protrusion being in contact with the nozzle surface and the first boundary surface.

10. The cleaning method for a discharging head according to claim 1, the cleaning method further including, after the second cover member cleaning step, a first cover member cleaning step for cleaning the first cover member by the second wiping member, with the discharging head and the second cleaning part reciprocating relative to each other along the first direction.

11. The cleaning method for a discharging head according to claim 10, wherein the discharging head includes a side wall intersecting the nozzle surface, the first cover member includes an outer side surface extending along the side wall, and the first cover member cleaning step includes an outer side surface wiping step for cleaning the outer side surface by the second wiping member.

12. The cleaning method for a discharging head according to claim 1, wherein in the nozzle surface wiping step, the first cleaning part moves relative to the discharging head, with the first wiping member moving from the first end edge toward the second end edge.

13. The cleaning method for a discharging head according to claim 1, wherein in the second cover member cleaning step, the discharging head reciprocates relative to the second cleaning part.

14. The cleaning method for a discharging head according to claim 1, wherein the second cleaning part includes a holder detachably mounted to the second holding unit and the second wiping member is detachably attached to the holder.

15. The cleaning method for a discharging head according to claim 1, wherein the second cleaning part includes a cleaner with which the first wiping member is cleaned, the second holding unit holds the second wiping member on a first side and holds the cleaner on a second side opposite to the first side, a second direction intersecting the first direction is a direction along the nozzle surface, a third direction intersecting both the first direction and the second direction is a direction intersecting the nozzle surface, the first holding unit and the second holding unit are each configured to individually reciprocate in both the second direction and the third direction, and the cleaning method further includes, after the nozzle surface wiping step, a first wiping member cleaning step for cleaning the first wiping member by the cleaner, with the first holding unit and the second holding unit moving relative to each other along the second direction.

* * * * *